(12) United States Patent
Ikenaga et al.

(10) Patent No.: US 10,471,354 B2
(45) Date of Patent: Nov. 12, 2019

(54) GAME SYSTEM, GAME CONTROLLING METHOD, AND GAME CONTROLLING PROGRAM

(71) Applicant: Sony Computer Entertainment Inc., Tokyo (JP)

(72) Inventors: Toshiya Ikenaga, Tokyo (JP); Nobuaki Tanaka, Saitama (JP); Yasuhiro Watari, Tokyo (JP); Toshiharu Sayano, Kanagawa (JP); Hiromasa Ohkubo, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 13 days.

(21) Appl. No.: 15/027,270

(22) PCT Filed: May 14, 2014

(86) PCT No.: PCT/JP2014/002536
§ 371 (c)(1),
(2) Date: Apr. 5, 2016

(87) PCT Pub. No.: WO2015/056369
PCT Pub. Date: Apr. 23, 2015

(65) Prior Publication Data
US 2016/0250553 A1 Sep. 1, 2016

(30) Foreign Application Priority Data
Oct. 17, 2013 (JP) .................................. 2013-216648

(51) Int. Cl.
*A63F 13/86* (2014.01)
*A63F 13/525* (2014.01)
(Continued)

(52) U.S. Cl.
CPC ........ *A63F 13/525* (2014.09); *A63F 13/5255* (2014.09); *A63F 13/803* (2014.09);
(Continued)

(58) Field of Classification Search
CPC ...................................................... A63F 13/86
See application file for complete search history.

(56) References Cited

U.S. PATENT DOCUMENTS 6,755,743 B1 6/2004 Yamashita
6,774,900 B1 8/2004 Kubota
(Continued)

FOREIGN PATENT DOCUMENTS

CN  1294722 A   5/2001
CN  101316637 A  12/2008
(Continued)

OTHER PUBLICATIONS

Extended European Search Report for corresponding European Patent Application No. 14854702.9, 8 pages, dated Apr. 21, 2017.
(Continued)

*Primary Examiner* — James S. McClellan
*Assistant Examiner* — Kevin M Carter
(74) *Attorney, Agent, or Firm* — Matthew B. Dernier, Esq.

(57) ABSTRACT

In a game system, a game managing server includes: a game controlling unit that controls a game; a game player instruction receiving unit that receives an instruction from a game player and forwards the instruction to the game controlling unit; and a watching point setting unit that sets a viewpoint position for generating a watching screen for viewing the game, the watching screen being offered to a plurality of watching players different from the game player.

9 Claims, 17 Drawing Sheets

(51) Int. Cl.
*A63F 13/803* (2014.01)
*A63F 13/5255* (2014.01)

(52) U.S. Cl.
CPC ........ *A63F 13/86* (2014.09); *A63F 2300/577* (2013.01); *A63F 2300/6036* (2013.01)

(56) References Cited

U.S. PATENT DOCUMENTS

| | | | |
|---|---|---|---|
| 7,458,894 | B2 | 12/2008 | Danieli |
| 9,339,733 | B2* | 5/2016 | Boudville ............ A63F 13/335 |
| 9,597,586 | B1* | 3/2017 | Wiklem ............ A63F 13/12 |
| 2003/0038805 | A1* | 2/2003 | Wong ............ A63F 13/12 345/473 |
| 2004/0198497 | A1 | 10/2004 | Yamashita |
| 2004/0198498 | A1 | 10/2004 | Yamashita |
| 2005/0085296 | A1* | 4/2005 | Gelb ............ A63F 13/12 463/31 |
| 2006/0058103 | A1* | 3/2006 | Danieli ............ A63F 13/12 463/42 |
| 2006/0098013 | A1 | 5/2006 | Wong |
| 2007/0117635 | A1 | 5/2007 | Spanton |
| 2007/0265089 | A1* | 11/2007 | Robarts ............ A63F 13/12 463/42 |
| 2008/0229352 | A1* | 9/2008 | Pino ............ G06Q 30/02 725/22 |
| 2009/0208181 | A1* | 8/2009 | Cottrell ............ A63F 13/497 386/278 |
| 2009/0209348 | A1 | 8/2009 | Roberts |
| 2009/0267943 | A1 | 10/2009 | Asami |
| 2010/0079585 | A1* | 4/2010 | Nemeth ............ H04N 13/337 348/54 |
| 2010/0096491 | A1* | 4/2010 | Whitelaw ............ A63K 3/00 244/15 |
| 2010/0205628 | A1* | 8/2010 | Davis ............ H04M 1/72533 725/25 |
| 2011/0010732 | A1* | 1/2011 | Opdycke ............ G06Q 30/02 725/10 |
| 2011/0263332 | A1* | 10/2011 | Mizrachi ............ A63F 13/12 463/42 |
| 2012/0086631 | A1 | 4/2012 | Osman |
| 2013/0263021 | A1* | 10/2013 | Dunn ............ H04L 12/1827 715/756 |
| 2014/0004951 | A1* | 1/2014 | Kern ............ A63F 13/86 463/42 |
| 2014/0113718 | A1* | 4/2014 | Norman ............ A63F 13/12 463/31 |

FOREIGN PATENT DOCUMENTS

| | | |
|---|---|---|
| JP | 2001120841 A | 5/2001 |
| JP | 2001230868 A | 8/2001 |
| JP | 2003141569 A | 5/2003 |
| JP | 2003164672 A | 6/2003 |
| JP | 2003175278 A | 6/2003 |
| JP | 2006081895 A | 3/2006 |
| JP | 2009112708 A | 5/2009 |
| JP | 2011005306 A | 1/2011 |

OTHER PUBLICATIONS

Office Action for corresponding Japanese Patent Application No. 2013-216648, 12 pages, dated Jul. 25, 2017.
Project Gotham Racing 3, Famitsu Xbox 360, vol. 5, No. 1; Japan, Enterbrain Inc., Jan. 1, 2006, 6 Pages (for relevance see Office Action for corresponding Japanese Patent Application No. 2013-216648, 12 pages, dated Jul. 25, 2017 cited above).
International Preliminary Report on Patentability and Written Opinion for corresponding PCT Application No. PCT/JP2014/002536, 8 pages, dated Apr. 28, 2016.
International Search Report for corresponding PCT Application No. PCT/JP2014/002536, 2 pages, dated Aug. 12, 2014.
Shukan Famitsu "Super Street Fighter IV" 3rd Edition, vol. 26, No. 10, 6 pages, Feb. 17, 2011 (for relevancy see International Search Report for corresponding PCT Application No. PCT/JP2014/002536, 2 pages, dated Aug. 12, 2014 cited above).
Notification of Reasons for Refusal for corresponding Japanese Patent Application No. 2013-216648, 12 pages, dated Dec. 13, 2016.
Notification of Reason for Refusal for corresponding Japanese Patent Application No. 2018-032034, 11 pages, dated Jan. 15, 2019.
Open version finally started! Reporting on playing "Battlefield 4," Game Watch, [online], searched for on Dec. 13, 2018; URL,https://game.watch.impress.co.jp/docs/new/618441.html, 7 pages, dated Oct. 7, 2013 (for relevance see Office Action for corresponding Japanese Patent Application No. 2018-032034 cited above).
[E3 2013] An interview with the executive producer of "Battlefield 4." Details revealed about the commander mode and a new system in which the map changes dynamically, 4Gamer.net, [online], searched for on Dec. 13, 2018; URL,https://www.4gamer.net/games/175/G017558/20130614110/ 17 pages, dated Jun. 15, 2013 (for relevance see Office Action for corresponding Japanese Patent Application No. 2018-032034 cited above).
Battlefield 1942 (Electronic Arts Square), 4Gamer.net, [online], searched for on Dec. 14, 2018, URL, https://web.archive.org/web/20021212030808/http://www.4gamer.net:80/patch/demo/data/bf1942mp.html, 3 pages dated Dec. 12, 2002 (literature indicative of prior art) (for relevance see Office Action for corresponding Japanese Patent Application No. 2018-032034 cited above).
The First Office Action for corresponding Chinese Patent Application No. 201480055957.4, 17 pages, dated Sep. 30, 2018.
Extended European Search Report for corresponding EP Application No. 19150240.0, 11 pages, dated Mar. 1, 2019.
Martin Otten: "Broadcasting Virtual Games in the Internet" Retrieved from the Internet: URL:http://www.slipgate.de/download/BroadcastingVirtualGames.pdf 11 pages, dated Jun. 1, 2001.
Notification of Reasons for Refusal for corresponding JP Application No. 2018-032034, 14 pages, dated Jul. 30, 2019.

* cited by examiner

GAME SYSTEM, GAME CONTROLLING METHOD, AND GAME CONTROLLING PROGRAM

TECHNICAL FIELD

The present invention relates to a game controlling technology. More particularly, the invention relates to a game system, a game controlling method, and a game controlling program for controlling a game in which a plurality of players can participate.

BACKGROUND ART

The widespread acceptance of terminal devices capable of executing games has resulted in a huge variety of games being offered. Some games are designed to be casually played and enjoyed for a short time; some others are played deliberately and enjoyed over a long period of time.

SUMMARY

Technical Problem

The natural advantage of the many varieties of games being offered is the availability of a wide range of games to choose from. This, however, can be a disadvantage to some players having difficulty in dealing with too many choices. Many of these players hesitate to play time-consuming or hard-to-play games. There is a need for a technology that will allow such hesitant players to casually participate in the apparently difficult games.

The present invention has been made in view of the above circumstances. An object of the invention is to provide a technology that will allow players to enjoy games more casually than before.

Solution to Problem

One embodiment of the present invention is a game controlling program. This game controlling program causes a computer to function as: a game controlling unit controlling a game; a game player instruction receiving unit receiving an instruction from a game player and forwarding the instruction to the game controlling unit; and a watching point setting unit setting a viewpoint position for generating a watching screen for viewing the game, the watching screen being offered to a plurality of watching players different from the game player.

Where other combinations of the above-outlined composing elements or the above expressions of the present invention are converted between different forms such as a method, a device, and a system, they still constitute effective embodiments of this invention.

Advantageous Effect of Invention

The present invention thus provides a technology that allows players to enjoy games more casually than before.

DESCRIPTION OF EMBODIMENTS

First Embodiment

A game system in the embodiment of the present invention offers the function of allowing other users to watch a game being played by a game player. The game system also offers the function of allowing a game watching user to execute a game-related action to affect the game. In the ensuing description, a player who plays a game will be referred to as "the game player," and a user who watches the game will be referred to as "the watching player." The game system controls the game in accordance with instructions from the game player while providing the game player with a game screen. The game system further generates a game watching screen different from the game screen offered to the game player. The game watching screen allows the watching player to enjoy watching the game from a viewpoint different from that of the game player. This provides opportunities for many watching players to casually watch the game and experience the joy of the game, thus promoting the acceptance of the game. The game player continues to play the game while being encumbered by the game watching players. This enables the game player to enjoy a different kind of fun than when playing alone. The game player can thus enjoy playing the game over a long time period without losing interest.

Figure 1:
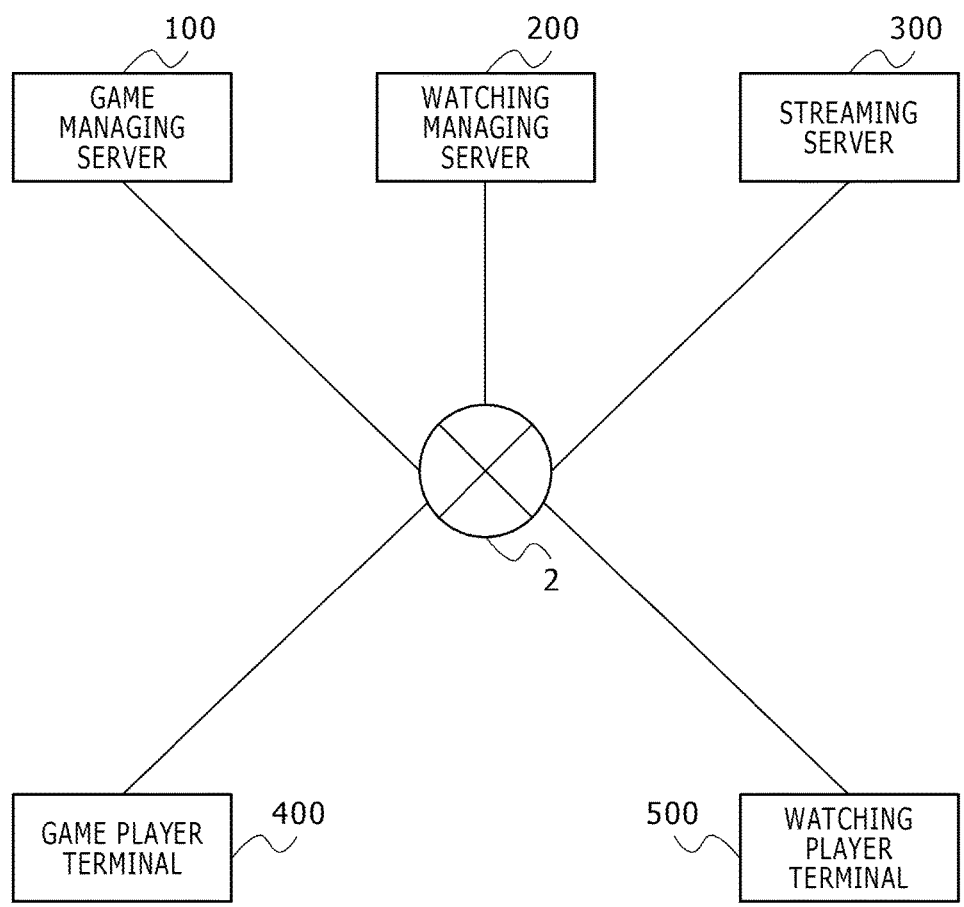
FIG. 1 is a schematic diagram showing an overall configuration of a game system in one embodiment of the present invention.

FIG. 1 shows an overall configuration of a game system in this embodiment. The game system 1 has a game managing server 100 that manages the game played by the game player, a watching managing server 200 that manages the function of allowing the game to be watched, a streaming server 300 that distributes a game watching screen, a game player terminal 400, a watching player terminal 500, and the Internet 2 as a typical network interconnecting these components. The game player terminal 400 transmits game-related instructions from the game player to the game managing server 100 via the Internet 2. The game player terminal 400 receives the game screen from the game managing server 100 and displays the received game screen. The watching player terminal 500 receives the game watching screen from the streaming server 300 via the Internet 2 and displays the received game watching screen. Where the watching player is allowed to execute game-related actions, the watching player terminal 500 receives from the watching managing server 200 a watching user interface defining the actions that can be executed by the watching player. The watching player terminal 500 further transmits an action-executing instruction of the watching player to the watching managing server 200.

This embodiment assumes that the same game watching screen is viewed by numerous watching players. Given that assumption, it is required to prevent the numerous watching player terminals 500 from directly communicating with the game managing server 100. The requirement is met by the streaming server 300 distributing the game watching screen and by the watching managing server 200 managing the actions executed by the watching players. This scheme prevents the game managing server 100 from being overloaded by the many watching players watching the game. In another embodiment, the game managing server 100 may assume part or all of the functions of the watching managing server 200 and of the streaming server 300. In still another embodiment, the watching managing server 200 may assume the functions of the streaming server 300.

The game system 1 may manage the watching of a plurality of games. That is, the game system 1 may have a plurality of game managing servers 100 managing a plurality of different games. The watching managing server 200 may be included in each of the individual game managing servers 100 to manage the watching of the game managed by each game managing server 100. Alternatively, a single watching managing server 200 may manage the watching of a plurality of games managed by a plurality of game managing servers 100. In the latter case, the watching managing server 200 may allow the watching player to select the game to watch from among the games managed by the multiple game managing severs 100. Likewise, the streaming server 300 may be included in each of the game managing servers 100. A single streaming server 300 may also distribute a plurality of game watching screens.

Figure 2:
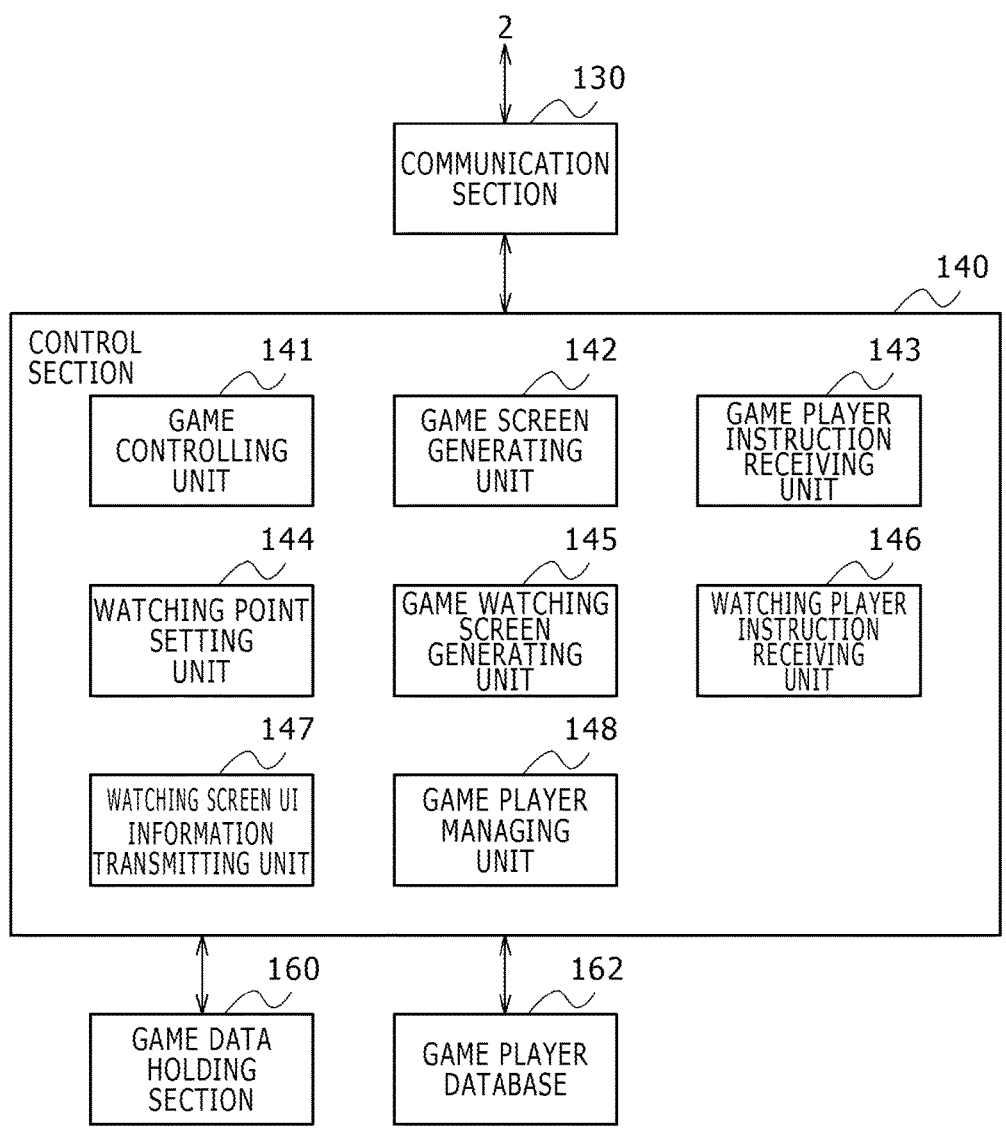
FIG. 2 is a schematic diagram showing a structure of a game managing server in one embodiment of the present invention.

FIG. 2 shows a structure of the game managing server 100 in this embodiment. The game managing server 100 has a communication section 130, a control section 140, a game data holding section 160, and a game player database 162. These components may be implemented using hardware including the CPU of a computer, its memory, and programs loaded into the memory. The functional blocks implemented by such components coordinating with one another are depicted here. It will be understood by those skilled in the art that these functional blocks are implemented by hardware alone, by software alone, or by combinations of both in diverse forms.

The communication section 130 transmits and receives data to and from another apparatus via the Internet 2. The control section 140 allows the game to proceed on the basis of game-related instructions issued by the game player and received through the game player terminal 400. The game data holding section 160 holds the data and other resources necessary for enabling the game to proceed. The game player database 162 holds information about the game player playing the game managed by the game managing server 100. For example, the game player database 162 may hold the ID, name, avatar, attributes, and level of the game player.

The control section 140 includes a game controlling unit 141, a game screen generating unit 142, a game player instruction receiving unit 143, a watching point setting unit 144, a game watching screen generating unit 145, a watching player instruction receiving unit 146, a watching screen UI information transmitting unit 147, and a game player managing unit 148.

The game player managing unit 148 receives game player information from the game player terminal 400 and registers the received information to the game player database 162. The game player managing unit 148 further manages updates and deletion of the information registered in the game player database 162. On receiving a game starting request from the game player terminal 400, the game player managing unit 148 acquires authentication information about the game player from the game player terminal 400. The game player managing unit 148 proceeds to authenticate the game player by referencing the information registered in the game player database 162. After successful authentication of the game player, the game player managing unit 148 allows the game controlling unit 141 to start the game.

The game controlling unit 141 executes a game program for controlling the game to be played by the game player. The game controlling unit 141 allows the game to proceed by transmitting and receiving the data necessary for game control to and from the game player terminal 400.

The game screen generating unit 142 generates the game screen to be controlled by the game controlling unit 141. The game screen generating unit 142 generates the game screen as follows: In a two-dimensional or three-dimensional game world in which the game is to be played, the game screen generating unit 142 first sets a viewpoint position and a line-of-sight direction for rendering the game field in which the characters, items, and objects of the game, among others, are arranged. The game screen generating unit 142 then renders the game field as seen from the viewpoint position in the line-of-sight direction thus established. The viewpoint position and the line-of-sight direction may be set by the game program, or set or changed in accordance with instructions from the game player terminal 400. The game screen generating unit 142 transmits the generated game screen to the game player terminal 400 via the communication section 130. This embodiment is explained using an example in which the game managing server 100 generates the game screen. In another embodiment, the game player terminal 400 may generate the game screen. In this case, the game managing server 100 replaces the game screen generating unit 142 with a structure for transmitting to the game player terminal 400 the data and other resources necessary for the game player terminal 400 to generate the game screen.

The game player instruction receiving unit 143 receives game-related instructions issued by the game player and received through the game player terminal 400. The game player instruction receiving unit 143 forwards the received instructions to the game controlling unit 141. The game controlling unit 141 controls the game in accordance with the game player's instructions forwarded from the game player instruction receiving unit 143.

The watching point setting unit 144 sets the viewpoint from which the watching player watches the game controlled by the game controlling unit 141. When the game watching screen generating unit 145 generates the game watching screen, the watching point setting unit 144 sets the viewpoint position for rendering the game field. The watching point setting unit 144 may hold beforehand a plurality of positions, any one of which may be set as the viewpoint position for watching. The watching point setting unit 144 may then select one of the viewpoint positions for watching in accordance with predetermined conditions. The watching point setting unit 144 may also change dynamically the viewpoint position for watching in accordance with predetermined conditions. For example, if the viewpoint for watching is set on a mobile object such as a vehicle or an aircraft, the watching point setting unit 144 may automatically move the mobile object having the viewpoint according to a predetermined algorithm. The watching point setting unit 144 may further generate a new viewpoint for watching or delete the existing one under predetermined conditions. For example, if a new object is placed into the game field in the course of the game, the watching point setting unit 144 may set the viewpoint on the newly placed object. The watching point setting unit 144 may also set a plurality of viewpoints for watching to let the watching player switch from one viewpoint to another during watching.

The watching point setting unit 144 may set conditions for the watching player with regard to each viewpoint for watching. For example, the watching point setting unit 144 may set a maximum number of watching players allowed to watch the game. The maximum number may be determined in accordance with the processing capacity of the watching managing server 200 or of the streaming server 300. The watching point setting unit 144 may also set attributes of the watching players allowed to watch the game. For example, at a given viewpoint, the watching point setting unit 144 may allow only a male watching player to watch; at another viewpoint, the watching point setting unit 144 may allow only a female watching player to watch.

For each viewpoint for watching, the watching point setting unit 144 sets an action that can be executed by the watching player. The action executable by the watching player may be defined beforehand by the game program, or changed dynamically in the course of the game, for example.

The watching point setting unit 144 transmits the information about the watching point thus established to the watching managing server 200.

The game watching screen generating unit 145 generates the game watching screen by rendering the game field using the viewpoint position set by the watching point setting unit 144. The game watching screen generating unit 145 transmits the generated game watching screen to the streaming server 300 for distribution. The game watching screen generating unit 145 may alternatively render a game field having an angle of view wider than that of the actual game screen. This rendering is intended to allow the watching player to change the line-of-sight direction to watch the game field wider than the game screen. For example, the game watching screen generating unit 145 may render a horizontally extended game field that will enable the line-of-sight direction to be changed from side to side. As another alternative, the game watching screen generating unit 145 may render a spherical, 360-degree game field so that things can be seen in all directions in the three-dimensional game field.

This embodiment allows a plurality of watching players to watch the game from a single watching point. That is, the streaming server 300 distributes the game watching screen generated by the game watching screen generating unit 145 to a plurality of watching player terminals 500, as will be discussed later. That means the watching point setting unit 144 does not accept the instruction to change the viewpoint position from any individual watching player. That is, no watching player is allowed to change the viewpoint position of the game watching screen. In another embodiment, the game watching screen generating unit 145 may generate a game watching screen for each watching player. In this case, the watching point setting unit 144 may receive the instruction to change the viewpoint position from the watching player terminal 500.

In this embodiment, the streaming server 300 distributes the game watching screen to the watching player terminal 500. In another embodiment, the game managing server 100 or the watching managing server 200 may distribute the game watching screen to the watching player terminal 500. In this case, the game managing server 100 or the watching managing server 200 may additionally include a structure in which the game screen generated by the game watching screen generating unit 145 is distributed to the watching player terminal 500.

This embodiment is explained using an example in which the game managing server 100 generates the game watching screen. In another embodiment, the watching player terminal 500 may generate the game watching screen. In this case, the game managing server 100 replaces the game screen generating unit 142 with a structure for transmitting the data and other resources necessary for the watching player terminal 500 to generate the game watching screen to the watching player terminal 500 or to the watching managing server 200. This structure has no need for the streaming server 300.

The watching player instruction receiving unit 146 receives game-related instructions from the watching player. Where intervention in the game by the watching player is receivable, the watching managing server 200 manages the game-related action to be executed by the watching player, as will be discussed later. That is, the watching player instruction receiving unit 146 does not directly receive instructions from the watching player terminal 500. Instead, the watching player instruction receiving unit 146 receives instructions from the watching managing server 200. Upon receipt of an instruction of action issued by the watching player through the watching managing server 200, the watching player instruction receiving unit 146 forwards the received instruction to the game controlling unit 141. The game controlling unit 141 executes the action as instructed to let the action be reflected in the game.

The watching screen UI information transmitting unit 147 transmits to the watching managing server 200 the information necessary for adding to the watching screen a user interface that defines the actions executable on the game being watched by the watching player. The watching screen UI information transmitting unit 147 may be defined beforehand by the game program, or may be set or changed dynamically by the watching point setting unit 144.

Figure 3:
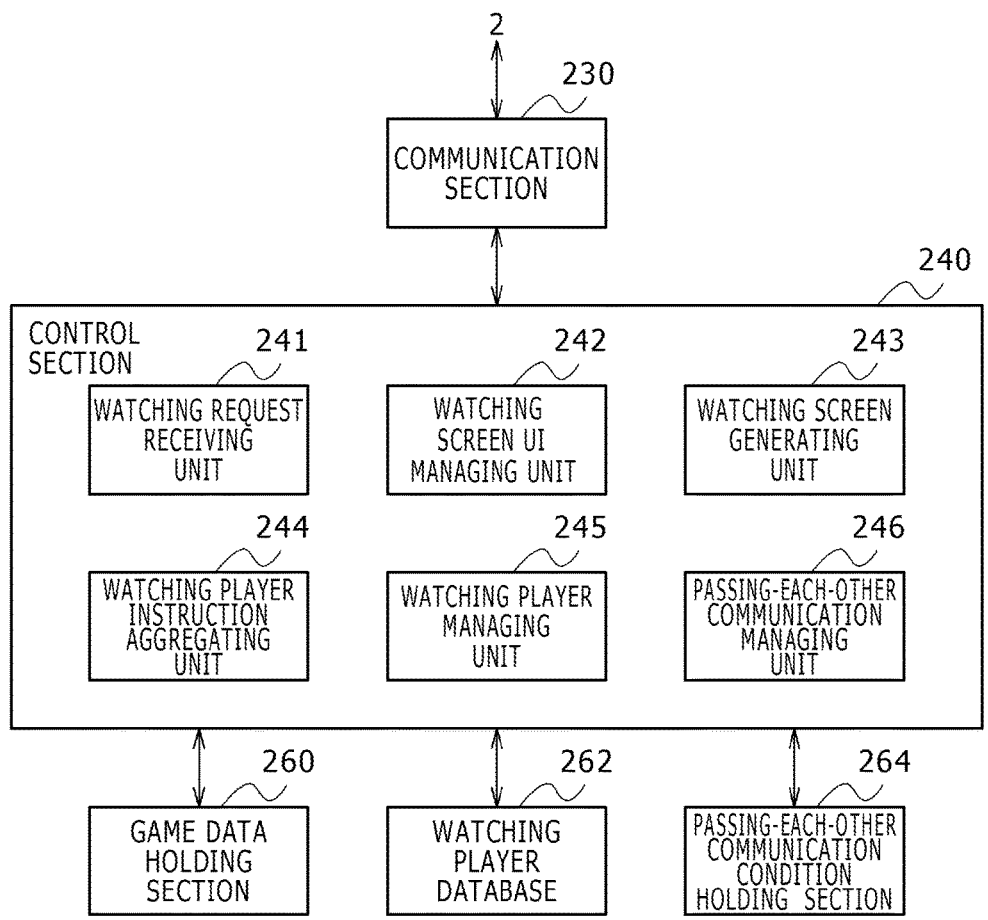
FIG. 3 is a schematic diagram showing a structure of a watching managing server in one embodiment of the present invention.

FIG. 3 shows a structure of the watching managing server in this embodiment. The watching managing server 200 has a communication section 230, a control section 240, a game data holding section 260, a watching player database 262, and a passing-each-other communication condition holding section 264. These structures are also implemented by hardware alone, by software alone, or by combinations of both in diverse forms.

The communication section 230 transmits and receives data to and from another apparatus via the Internet 2. The control section 240 manages the watching of the game by the watching player on the basis of the information received from the game managing server 100. The game data holding section 260 holds the data and other resources necessary for generating the watching screen and for managing the actions executable by the watching player. The watching player database 262 holds the information about the watching player requesting to watch the game. The passing-each-other communication condition holding section 264 holds the conditions regarding passing-each-other communication between players.

The control section 240 includes a watching request receiving unit 241, a watching screen UI managing unit 242, a watching screen generating unit 243, a watching player instruction aggregating unit 244, a watching player managing unit 245, and a passing-each-other communication managing unit 246.

The watching request receiving unit 241 receives a game watching request from the watching player terminal 500. The watching request receiving unit 241 receives the information about the viewpoint for watching the game from the game managing server 100, and stores the received information into the game data holding section 260. Upon receipt of access from the watching player terminal 500, the watching request receiving unit 241 reads from the game data holding section 260 the information about the viewpoint for watching the game, and presents the information to the watching player terminal 500. The watching request receiving unit 241 may graphically present a positional relation between the viewpoint for watching the game and the game field. If a game watching condition is set for each viewpoint for watching the game, the watching request receiving unit 241 may further present that conditions. Where a plurality of viewpoints are set, the watching request receiving unit 241 may graphically depict positional relations between the multiple viewpoint positions on the one hand and the entire game field on the other hand. If the game system 1 has a plurality of game managing servers 100, with the watching managing server 200 managing the watching of a plurality of games, the watching request receiving unit 241 may first present the watching player terminal 500 with a list of games that can be watched. The watching request receiving unit 241 may then receive the selection of the game to watch from the watching player terminal 500.

The watching player managing unit 245 acquires from the watching player terminal 500 the information about the watching player whose watching request has been received by the watching request receiving unit 241. The watching player managing unit 245 registers the information thus acquired to the watching player database 262. The watching player managing unit 245 manages updates and deletion of the information about the watching players.

The watching screen UI managing unit 242 manages the watching user interface offered to the watching player terminal 500 along with the game watching screen. The watching screen UI managing unit 242 acquires from the game managing server 100 the information about the watching user interface and stores the acquired information into the game data holding section 260. Upon receipt by the watching request receiving unit 241 of a watching request from the watching player terminal 500, the watching screen UI managing unit 242 reads from the game data holding section 260 the information about the watching user interface to be added to the game watching screen in effect at the viewpoint selected by the watching player. The watching screen UI managing unit 242 forwards the information thus read to the watching screen generating unit 243.

The watching screen UI managing unit 242 may add to the watching screen a user interface that defines the actions executable by the watching player without affecting the game. In this case, the watching screen UI managing unit 242 may permit execution of the actions not directly associated with the game managed by the game managing server 100. Such executable actions may include, for example, the clapping of hands and the interjection of cheering by the watching player. These actions are not reported to the game managing server 100 and will not be reflected in the game. Nevertheless, these actions may be used in analyzing the reputation of the watching player, for example. Upon execution of such an action, the watching screen generating unit 243 may generate a game watching screen showing how the action is being executed.

The watching screen generating unit 243 generates the watching screen to be displayed on the watching player terminal 500. The watching screen generating unit 243 generates the watching screen that includes a game watching screen generated by the game managing server 100 and distributed by the streaming server 300, and a watching user interface managed by the watching screen UI managing unit 242. For example, the watching screen generating unit 243 may generate the watching screen as a webpage that is transmitted to the watching player terminal 500 using HTTP and displayed by a web browser of the watching player terminal 500. The watching screen generating unit 243 embeds into the watching screen webpage the information from the streaming server 300 that distributes the game watching screen as viewed from the viewpoint selected by the watching player. The watching screen generating unit 243 also embeds into the watching screen webpage the script and other resources that describe the watching user interface defining the actions executable by the watching player from the selected viewpoint. This allows the watching player, who may not have a dedicated game terminal, to execute game-related actions while viewing the watching screen using, for example, a personal computer that has a browser for browsing webpages. The watching screen generating unit 243 may embed game watching screens of a plurality of games into the watching screen webpage. The watching screen generating unit 243 transmits the watching screen thus generated to the watching player terminal 500. Where the watching player terminal 500 generates the game watching screen as mentioned above, the watching screen generating unit 243 may transmit to the watching player terminal 500 only the watching user interface and the data necessary for generating the game watching screen.

The watching player instruction aggregating unit 244 aggregates the action execution instructions received from a plurality of watching player terminals 500. This embodiment assumes that a plurality of watching players view the same game watching screen. Given that assumption, it is not preferable to let all action execution instructions from individual watching players be reflected in the game. The watching player instruction aggregating unit 244 thus aggregates the action execution instructions from a plurality of watching players in accordance with a predetermined algorithm. The watching player instruction aggregating unit 244 then transmits to the game managing server 100 the aggregated instructions in the form of an action execution instruction representing all watching players. This gives numerous watching players an opportunity to intervene in the game while watching it. The watching player instruction aggregating unit 244 may perform instruction aggregation by statistically processing the action execution instructions from the watching players. For example, with a plurality of watching players issuing their action execution instructions, the watching player instruction aggregating unit 244 may determine the action execution instruction by majority vote. As another example, the watching player instruction aggregating unit 244 may determine the action execution instruction by calculating a mean, an arithmetic weighted mean, a median, and a mode of the aggregated instructions. As a further example, the watching player instruction aggregating unit 244 may determine that the instruction from the highest-level watching player is to represent the watching players as a whole. As an even further example, the watching player instruction aggregating unit 244 may determine that the instruction from the watching player watching the game over the longest time period is to represent all watching players.

In another embodiment, the action execution instructions from individual watching players may all be reflected in the game. In this case, the watching player instruction aggregating unit 244 may be replaced with a structure for transmitting the instructions received from the watching player terminals 500 to the game managing server 100.

The passing-each-other communication managing unit 246 manages passing-each-other communication between watching players. Passing-each-other communication generally refers to a scheme in which, when two players each possessing a game terminal holding save data or other information designed to conduct passing-each-other communication come within a predetermined distance of each other, their game terminals communicate with each other to generate a predetermined event on each game terminal. The passing-each-other communication managing unit 246 reads predetermined conditions for triggering passing-each-other communication from the passing-each-other communication condition holding section 264. If certain conditions are met between players not actually within a predetermined distance of each other, the passing-each-other communication managing unit 246 still considers the players to be within the predetermined distance of each other and thus conducts passing-each-other communication.

The conditions for triggering passing-each-other communication may include, for example, a condition requiring that the players watch the same game, a condition requiring that the players watch the game from the same viewpoint position, and a condition requiring that the players watch the game from one of a plurality of related viewpoint positions. Passing-each-other communication may be conducted between game players, between watching players, or between a game player and a watching player. The events generated by passing-each-other communication may include, for example, an event in which characters, items, objects, or other entities related to the game are exchanged; and an event in which the point value, level, or ability score of the game is increased between players. The passing-each-other communication managing unit 246 generates the event defined by the conditions held in the passing-each-other communication condition holding section 264. The passing-each-other communication managing unit 246 then reports generation of the event to the game player terminals or to the watching player terminals conducting passing-each-other communication therebetween.

Figure 4:
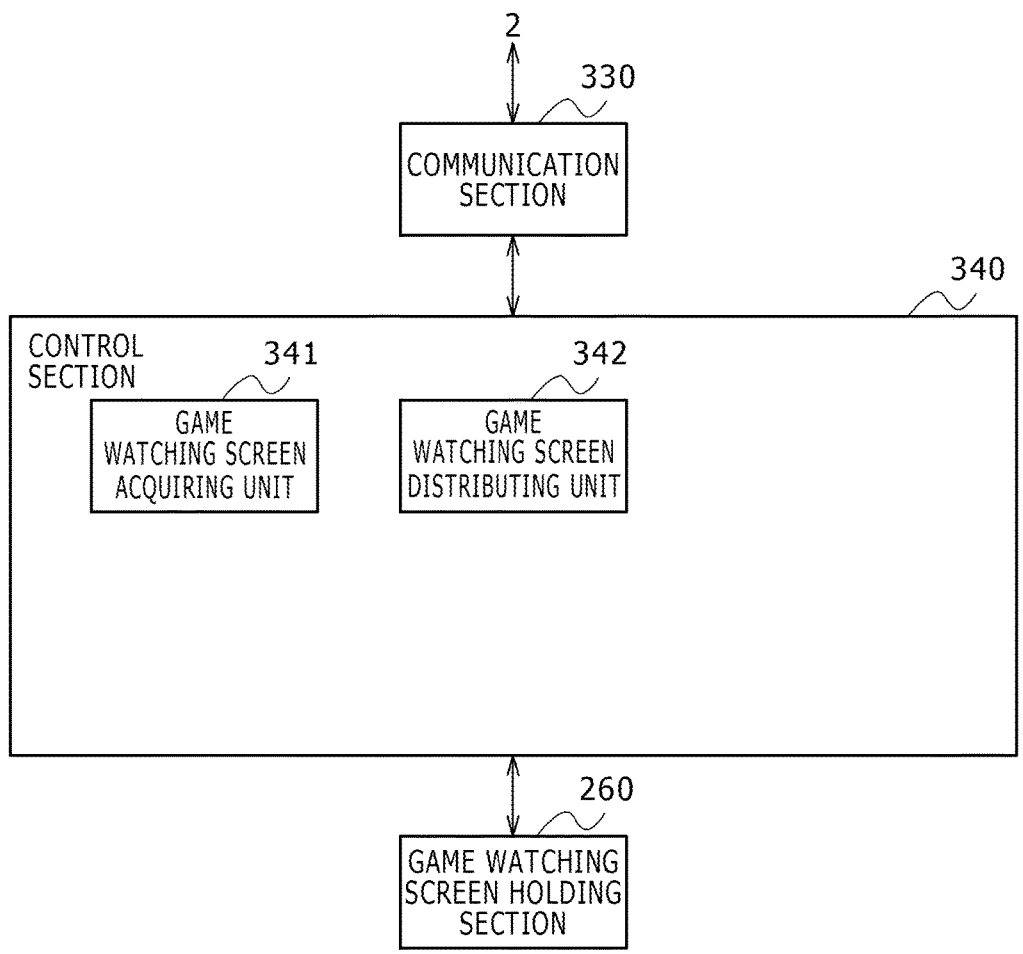
FIG. 4 is a schematic diagram showing a structure of a streaming server in one embodiment of the present invention.

FIG. 4 shows a structure of the streaming server in this embodiment. The streaming server 300 includes a communication section 330, a control section 340, and a game watching screen holding section 360. These structures are implemented by hardware alone, by software alone, or by combinations of both in diverse forms.

The communication section 330 transmits and receives data to and from another apparatus via the Internet 2. The control section 340 performs control to distribute the game watching screen received from the game managing server 100 to the watching player terminal 500. The game watching screen holding section 360 holds game watching screen data received from the game managing server 100.

The control section 340 includes a game watching screen acquiring unit 341 and a game watching screen distributing unit 342.

The game watching screen acquiring unit 341 acquires the game watching screen data from the game managing server 100 and stores the acquired data into the game watching screen holding section 360. The game watching screen distributing unit 342 reads the game watching screen data from the game watching screen holding section 360 in response to a request from the watching player terminal 500, and transmits the retrieved data to the requesting watching player terminal 500. Where the game watching screen is distributed only in real time, the game watching screen holding section 360 may temporarily hold the game watching screen data and delete the data after distributing the game watching screen to the watching player terminal 500.

Figure 5:
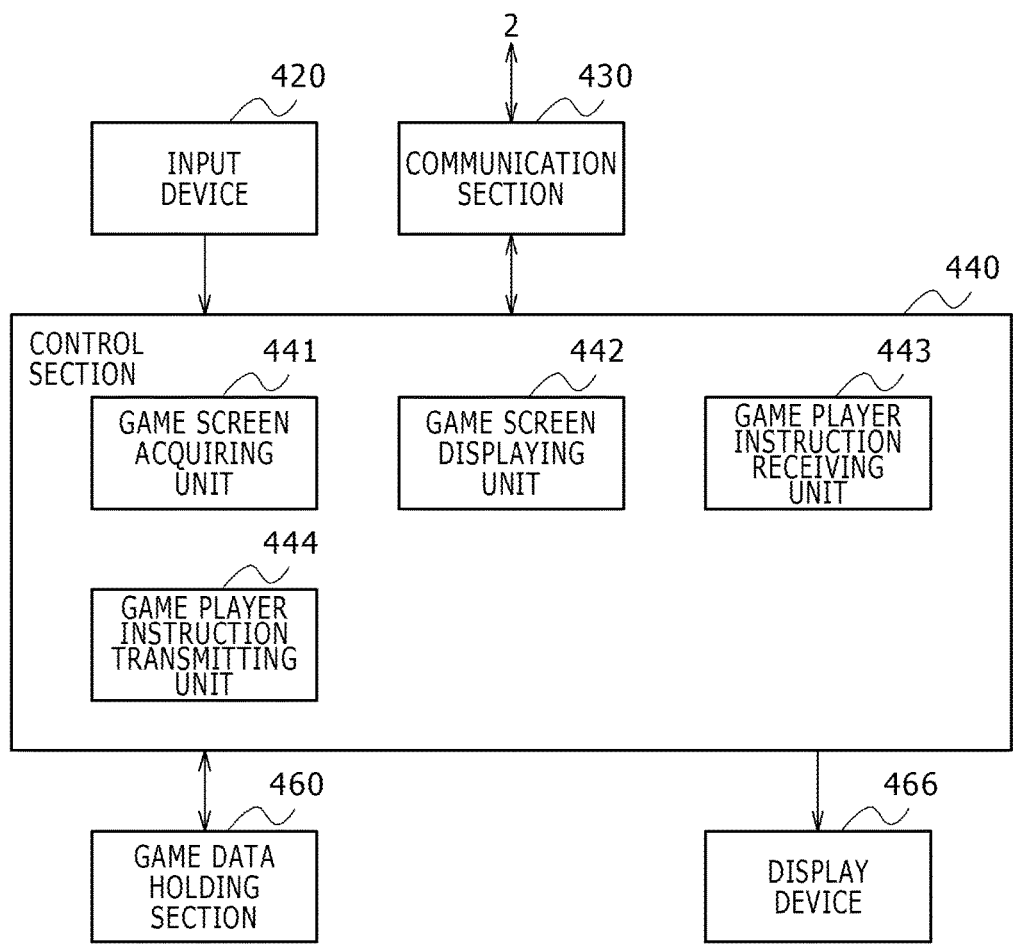
FIG. 5 is a schematic diagram showing a structure of a game player terminal in one embodiment of the present invention.

FIG. 5 shows a structure of the game player terminal in this embodiment. The game player terminal 400 has an input device 420, a communication section 430, a control section 440, a game data holding section 460, and a display device 466. These structures are implemented by hardware alone, by software alone, or by combinations of both in diverse forms.

The communication section 430 transmits and receives data to and from another apparatus via the Internet 2. The input device 420 receives instructions input from the game player, and forwards the received instructions to the control section 440. The input device 420 may be a controller having buttons and keys for allowing the game player to input the instructions. The control section 440 controls the game executed by the game player. The game data holding section 460 holds data and other resources necessary for controlling the game. The display device 466 displays the game screen controlled by the control section 440.

The control section 440 includes a game screen acquiring unit 441, a game screen displaying unit 442, a game player instruction receiving unit 443, and a game player instruction transmitting unit 444.

The game screen acquiring unit 441 acquires the game screen from the game managing server 100. In this embodiment, the game managing server 100 generates the game screen as described above. In another embodiment, the game player terminal 400 may generate the game screen. In this case, the game player terminal 400 will cause the game data holding section 460 to hold, for example, game field shape data necessary for rendering the game field, and shape data for making up characters, items, objects, and other entities to be arranged in the game field. The game player terminal 400 will further replace the game screen acquiring unit 441 with a structure for acquiring from the game managing server 100 the game-related information necessary for generating the game screen, and a structure for generating the game screen.

The game screen displaying unit 442 displays on the display device 466 the game screen acquired by the game screen acquiring unit 441 from the game managing server 100. The game player instruction receiving unit 443 receives game-related instructions input by the game player through the input device 420. The game player instruction transmitting unit 444 transmits the instruction received by the game player instruction receiving unit 443 to the game managing server 100.

Figure 6:
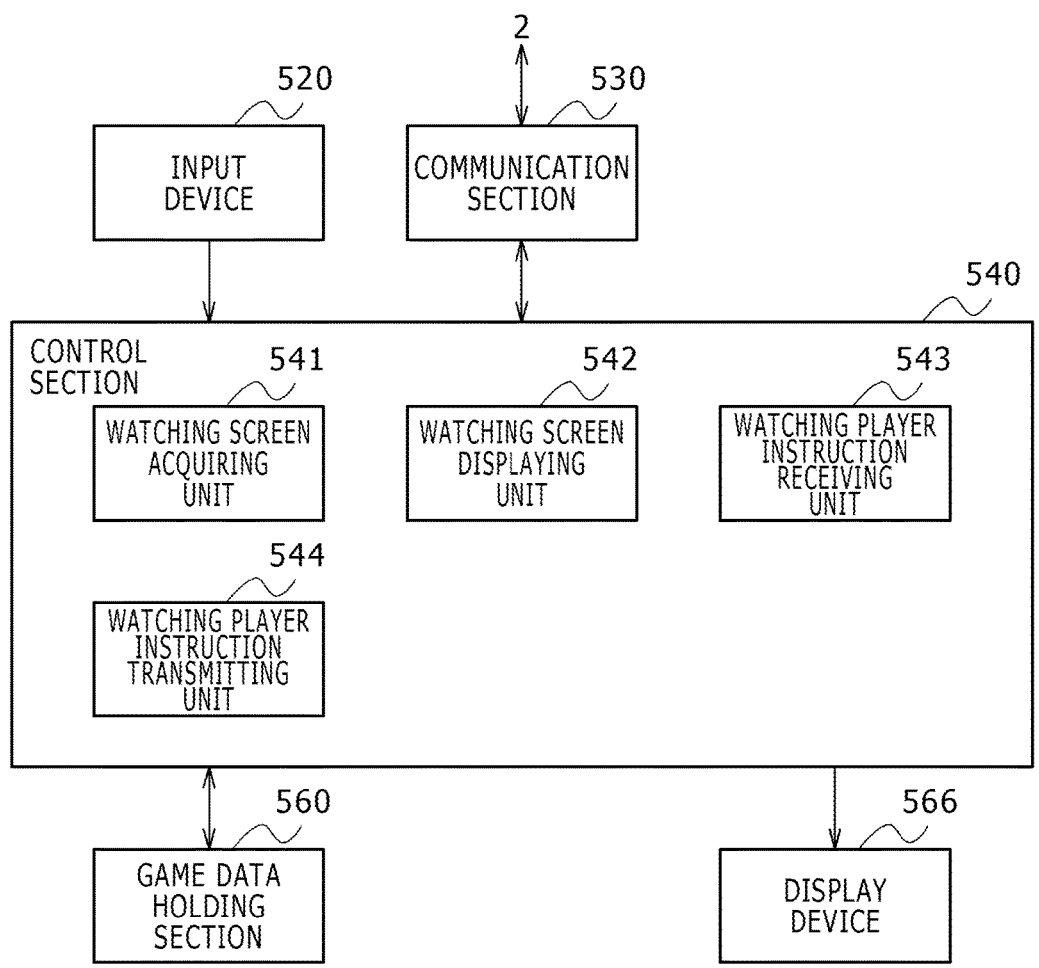
FIG. 6 is a schematic diagram showing a structure of a watching player terminal in one embodiment of the present invention.

FIG. 6 shows a structure of the watching player terminal in this embodiment. The watching player terminal 500 has an input device 520, a communication section 530, a control section 540, a game data holding section 560, and a display device 566. These structures are implemented by hardware alone, by software alone, or by combinations of both in diverse forms.

The communication section 530 transmits and receives data to and from another apparatus via the Internet 2. The input device 520 receives instructions input by the watching player, and forwards the received instructions to the control section 540. The input device 520 may be a controller having buttons and keys for allowing the watching player to input the instructions. The control section 540 controls the watching of the game. The game data holding section 560 holds the data and other resources necessary for watching the game. The display device 566 displays screens such as the watching screen.

The control section 540 includes a watching screen acquiring unit 541, a watching screen displaying unit 542, a watching player instruction receiving unit 543, and a watching player instruction transmitting unit 544.

The watching screen acquiring unit 541 acquires the watching screen from the watching managing server 200. In this embodiment, the game managing server 100 generates the game screen as descried above. In another embodiment, the watching player terminal 500 may generate the game screen. In this case, the watching player terminal 500 will cause the game data holding section 560 to hold, for example, game field shape data necessary for rendering the game field, and shape data for making up characters, items, objects, and other entities to be arranged in the game field. The watching player terminal 500 will further include a structure for acquiring from the game managing server 100 the game-related information necessary for generating the game watching screen, and a structure for generating the game watching screen.

The watching screen displaying unit 542 displays on the display device 566 the watching screen acquired from the watching managing server 200 by the watching screen acquiring unit 541. Where the watching screen includes a watching user interface that defines the actions executable by the watching player, the watching player instruction receiving unit 543 receives an action-related instruction input by the watching player through the input device 520. The watching player instruction transmitting unit 544 transmits to the watching managing server 200 the instruction received by the watching player instruction receiving unit 543.

Figure 7:
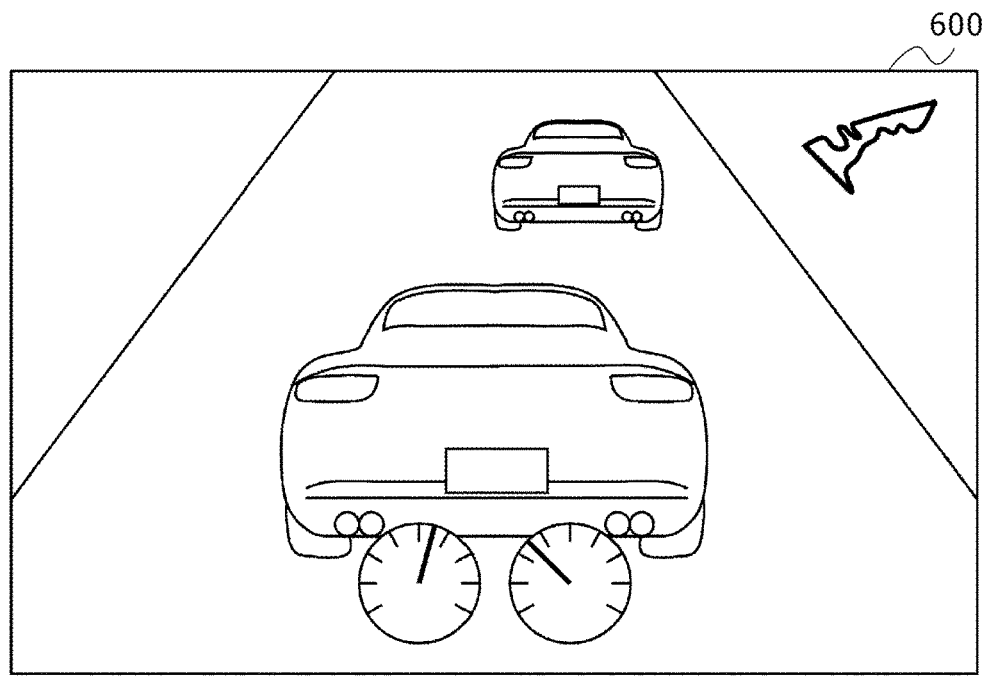
FIG. 7 is a schematic diagram showing a typical game screen displayed on the game player terminal.

FIG. 7 shows a typical game screen displayed on the game player terminal. This is a typical game screen of a car racing game in which game players drive their cars on a racing course. The game managing server 100 executes a car racing game program to generate a game screen 600 by rendering the racing course as viewed in the driving direction from a viewpoint position set behind the game player's car. The game managing server 100 transmits the generated game screen 600 to the game player terminal 400. The game screen acquiring unit 441 of the game player terminal 400 acquires the game screen from the game managing server 100. The game screen displaying unit 442 displays the acquired game screen 600 on the display device 466. The game player terminal 400 receives from the game player such instructions as operation of the steering wheel, operation of the accelerator pedal, and operation of brakes. The game player terminal 400 transmits the received instructions to the game managing server 100. The game managing server 100 controls the game player's car in accordance with the instructions received from the game player terminal 400.

Figure 8:
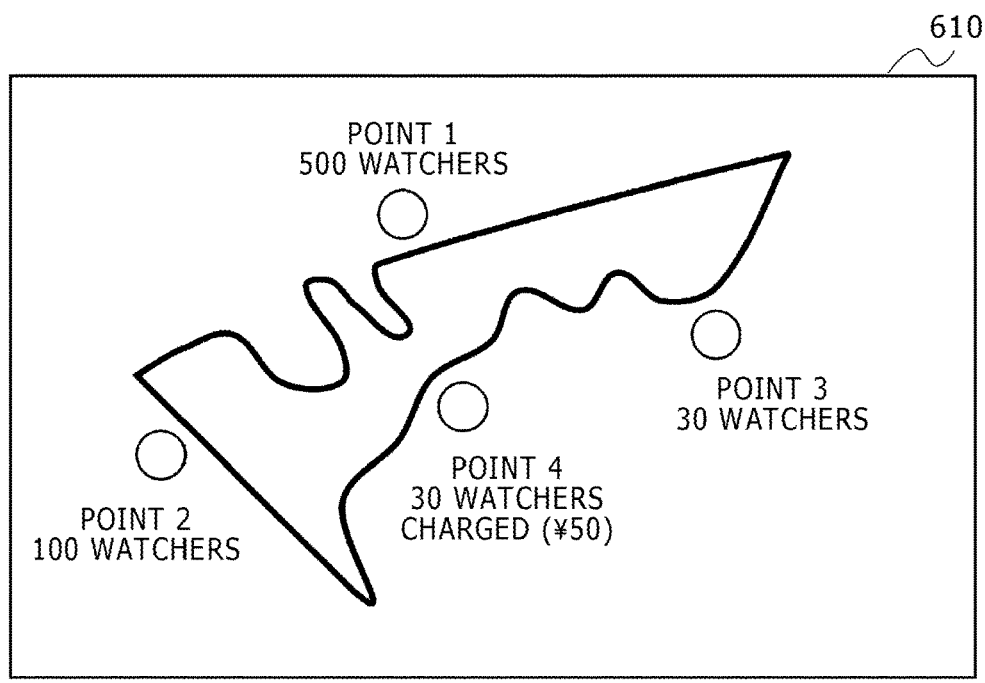
FIG. 8 is a schematic diagram showing a typical watching request receiving screen displayed on the watching player terminal.

FIG. 8 shows a typical watching request receiving screen displayed on the watching player terminal. In order to receive a request to watch the game shown in FIG. 7, the watching request receiving unit 241 of the watching managing server 200 transmits to the watching player terminal 500 a watching request receiving screen 610 that shows the entire racing course and a plurality of viewpoint positions from which the watching player can watch the game. The watching player terminal 500 displays the watching request receiving screen 610, receives the selected viewpoint position from which to watch the game from the watching player, and transmits the received viewpoint position to the watching managing server 200.

Figure 9:
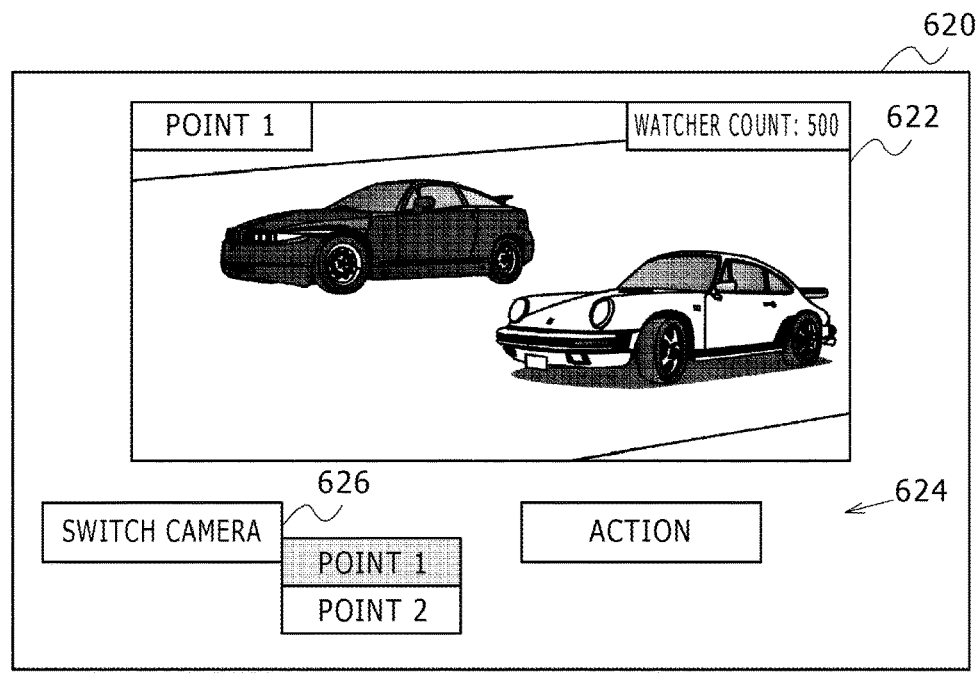
FIG. 9 is a schematic diagram showing a typical watching screen displayed on the watching player terminal.

FIG. 9 shows a typical watching screen displayed on the watching player terminal. When the watching request receiving unit 241 of the watching managing server 200 receives the selected viewpoint from the watching player terminal 500, the watching screen generating unit 243 generates a watching screen 620 that includes a game watching screen as viewed from the designated viewpoint and a watching user interface in effect at that viewpoint. The watching screen generating unit 243 further transmits the generated watching screen 620 to the watching player terminal 500. The watching screen acquiring unit 541 of the watching player terminal 500 acquires the watching screen 620 from the watching managing server 200. The watching screen displaying unit 542 displays the acquired watching screen 620 on the display device 566. The watching screen 620 shows a game watching screen 622 and a watching user interface 624. The watching user interface 624 includes a camera switching button 626. The watching player can change the viewpoint position by inputting an operation of the camera switching button 626.

Figure 10:
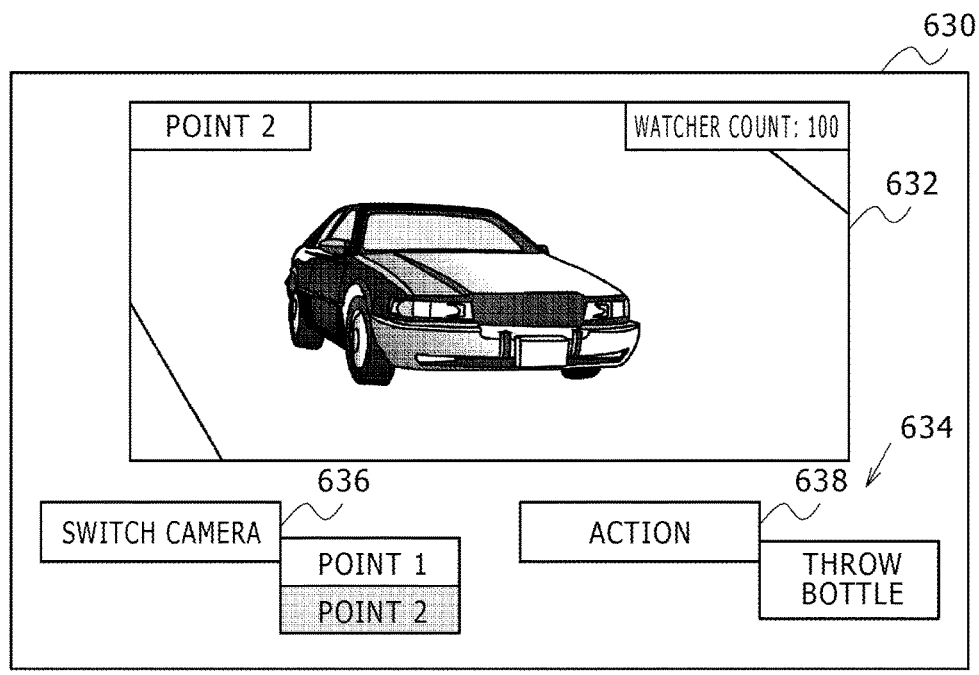
FIG. 10 is a schematic diagram showing another typical watching screen displayed on the watching player terminal.

FIG. 10 shows another typical watching screen displayed on the watching player terminal. When the watching player instruction receiving unit 543 receives the input of the camera switching button 626 through the watching screen 620 in FIG. 9, the watching player instruction transmitting unit 544 transmits the received instruction to the watching managing server 200. In accordance with the instruction received from the watching player terminal 500, the watching screen UI managing unit 242 of the watching managing server 200 changes the viewpoint position of the watching player. The watching screen generating unit 243 generates a watching screen 630 corresponding to the newly input viewpoint and transmits the generated watching screen 630 to the watching player terminal 500. The watching player terminal 500 displays the watching screen 630 acquired from the watching managing server 200. In this manner, the watching screen 630 is displayed on the display device 566 as shown in FIG. 10. The watching screen 630 displays a game watching screen 632 different from that in FIG. 9 and a watching user interface 634. The watching user interface 634 includes a camera switching button 636 and a button 638 for executing the action of throwing a bottle. The watching player may input an operation of the button 638 to throw a bottle onto the racing course, thereby encumbering the game player.

Figure 11:
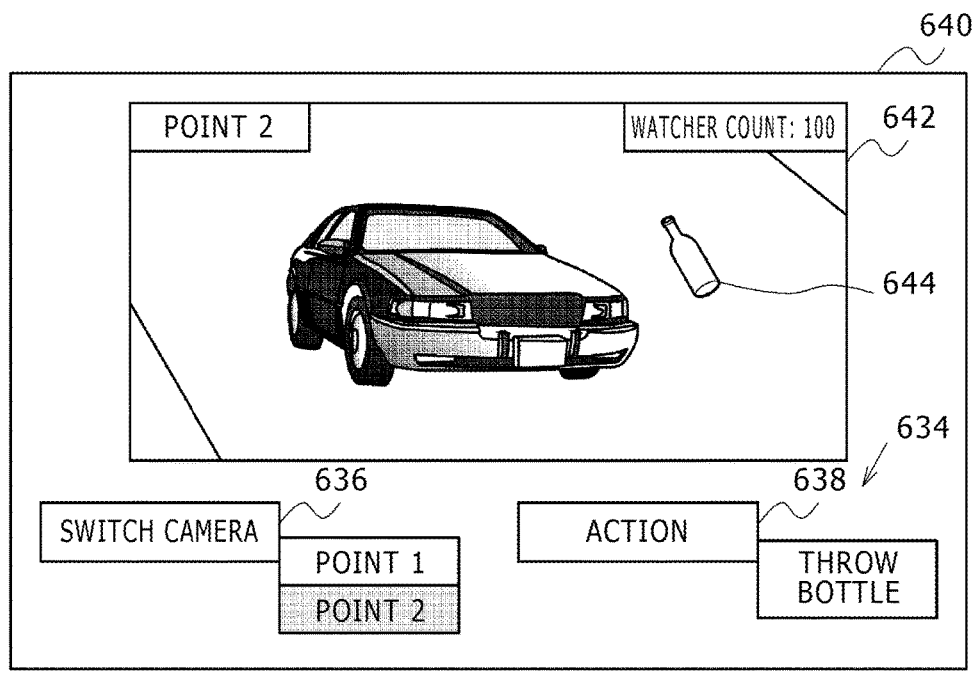
FIG. 11 is a schematic diagram showing still another typical watching screen displayed on the watching player terminal.

FIG. 11 shows still another typical watching screen displayed on the watching player terminal. When the watching player instruction receiving unit 543 receives the input of the button 638 through the watching screen 630 in FIG. 10, the watching player instruction transmitting unit 544 transmits the received instruction to the watching managing server 200. The watching player instruction aggregating unit 244 of the watching managing server 200 aggregates the instructions received from the watching player terminals 500 before determining an action to execute. If the watching player instruction aggregating unit 244 determines that the action of throwing a bottle onto the racing course from the viewpoint position of the watching player is to be executed, the watching player instruction aggregating unit 244 transmits an instruction to execute the action of throwing a bottle to the game managing server 100. Upon receipt of the instruction from the watching managing server 200, the watching player instruction receiving unit 146 of the game managing server 100 forwards the instruction to the game controlling unit 141. The game controlling unit 141 executes the action of throwing a bottle onto the racing course in accordance with the received instruction. Thus as shown in FIG. 11, a watching screen 640 displays a game watching screen 642 showing a bottle 644 getting thrown onto the racing course.

Figure 12:
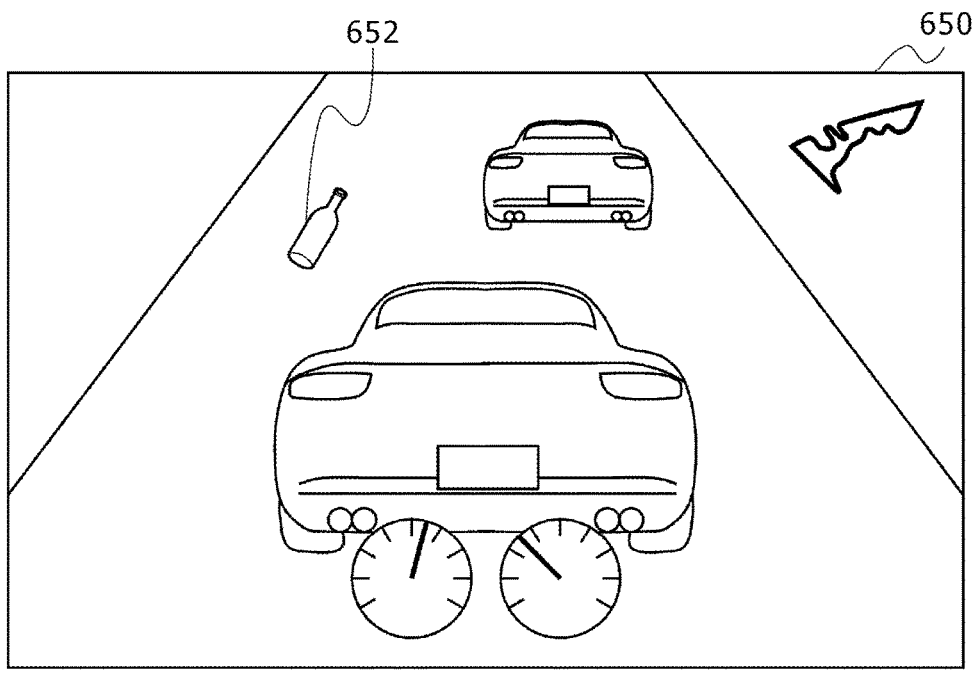
FIG. 12 is a schematic diagram showing a typical game screen displayed on the game player terminal.

FIG. 12 shows a typical game screen displayed on the game player terminal. The game controlling unit 141 executes the action of throwing the bottle onto the racing course in accordance with the received instruction. In turn, the game screen generating unit 142 generates a game screen 650 showing the action taking place and transmits the generated game screen 650 to the game player terminal 400. The game screen acquiring unit 441 of the game player terminal 400 acquires the game screen 650. The game screen displaying unit 442 displays the game screen 650 thus acquired on the display device 466. Thus as shown in FIG. 12, the game screen 650 shows a bottle 652 getting thrown onto the racing course.

Figure 13:
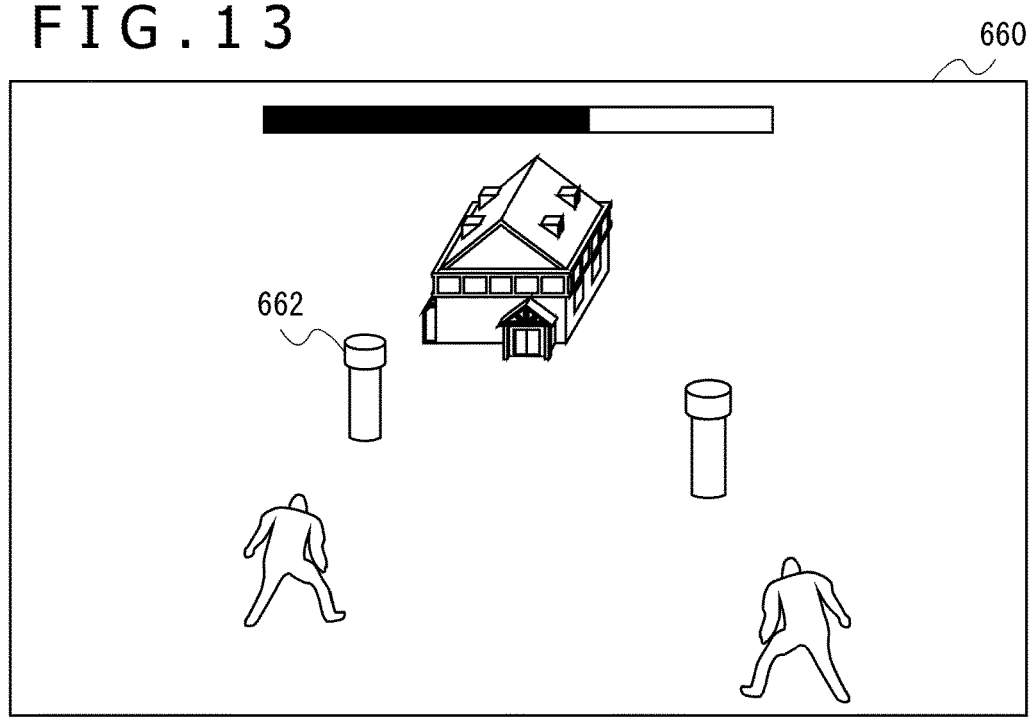
FIG. 13 is a schematic diagram showing another typical game screen displayed on the game player terminal.

FIG. 13 shows another typical game screen displayed on the game player terminal. This is a typical game screen of a tower defense game. The game player can build an attack tower in the surroundings of the game player's castle in order to defend the castle against monsters coming out of their lairs. When the game player instruction receiving unit 143 of the game managing server 100 receives from the game player terminal 400 an instruction to build an attack tower, the game controlling unit 141 builds the attack tower in a designated position and registers data to that effect in the game player database 162. In this manner, an attack tower 662 is built anew in the game field on a game screen 660.

At this time, the watching point setting unit 144 sets a watching viewpoint for the newly built attack tower 662. The watching screen UI information transmitting unit 147 transmits to the watching managing server 200 the information about a watching user interface that allows the watching player to execute the action of shooting at monsters from the newly set viewpoint of the attack tower 662. On the basis of the information acquired from the game managing server 100, the watching managing server 200 receives anew a request to watch from the viewpoint of the attack tower 662. In this manner, the watching player can change the viewpoint to the attack tower 662 and participate in the game as a shooter shooting at the monsters from the attack tower 662.

Figure 14:
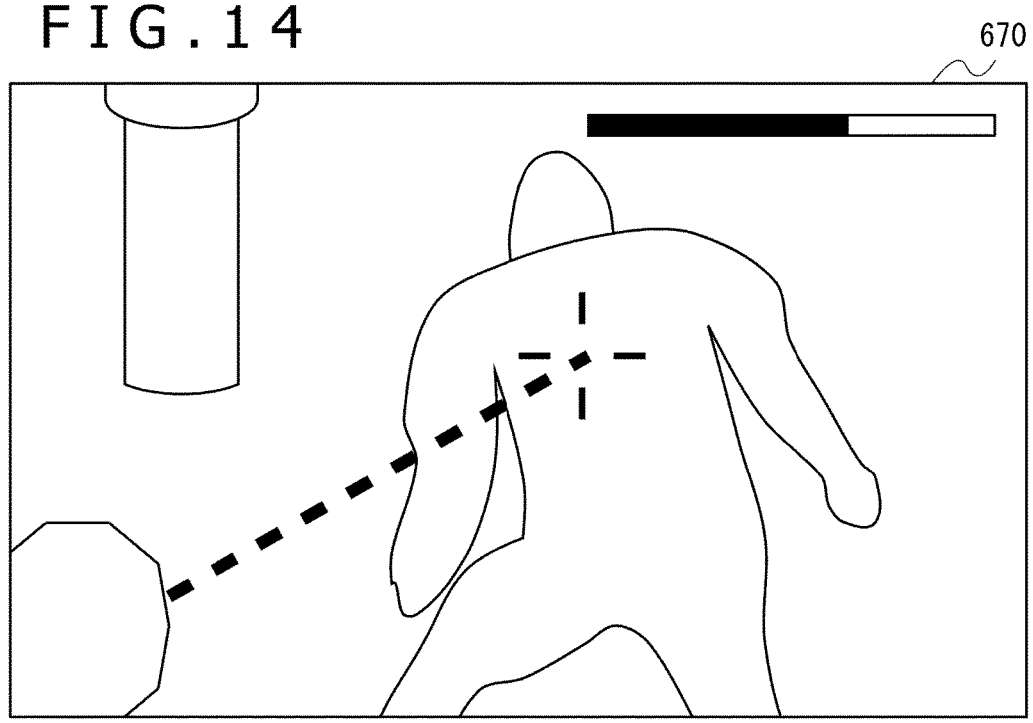
FIG. 14 is a schematic diagram showing still another typical watching screen displayed on the watching player terminal.

FIG. 14 shows still another typical watching screen displayed on the watching player terminal. When the watching player changes the viewpoint to the attack tower 662, the display device 566 displays a watching screen 670 that includes a game watching screen showing the game field as viewed from the attack tower 662. The watching player can move a sight 672 typically using arrow keys and shoot by operating buttons, for example. The watching player's instructions to execute the shooting action are transmitted from the watching player terminal 500 to the game managing server 100 via the watching managing server 200. The game managing server 100 causes the transmitted instructions to be reflected in the game. At this time, the watching screen 670 may display an avatar of the watching player and show how the avatar of the watching player is executing the action. The watching player's avatar may be rendered on the watching screen by the watching screen generating unit 243 of the watching managing server 200. Alternatively, the avatar may be superimposed on the watching screen by the watching screen displaying unit 542 of the watching player terminal 500.

Figure 15:
FIG. 15 is a schematic diagram showing still another typical watching screen displayed on the watching player terminal.

FIG. 15 shows still another typical watching screen displayed on the watching player terminal. The game shown in FIG. 13 provides the watching player with a watching screen 680 as viewed from the viewpoint of an armored helicopter. The armored helicopter is moved by the watching point setting unit 144 of the game managing server 100. That is, the watching player cannot move the viewpoint position by himself or herself. Instead, the watching player moves on board the armored helicopter being moved automatically. As mentioned above, the game watching screen generating unit 145 may generate beforehand a game watching screen having a wider angle of view, allowing the watching player to change the line-of-sight direction. This enables the watching player to search for a monster while changing the line-of-sight direction and to shoot at the encountered monster.

Figure 16:
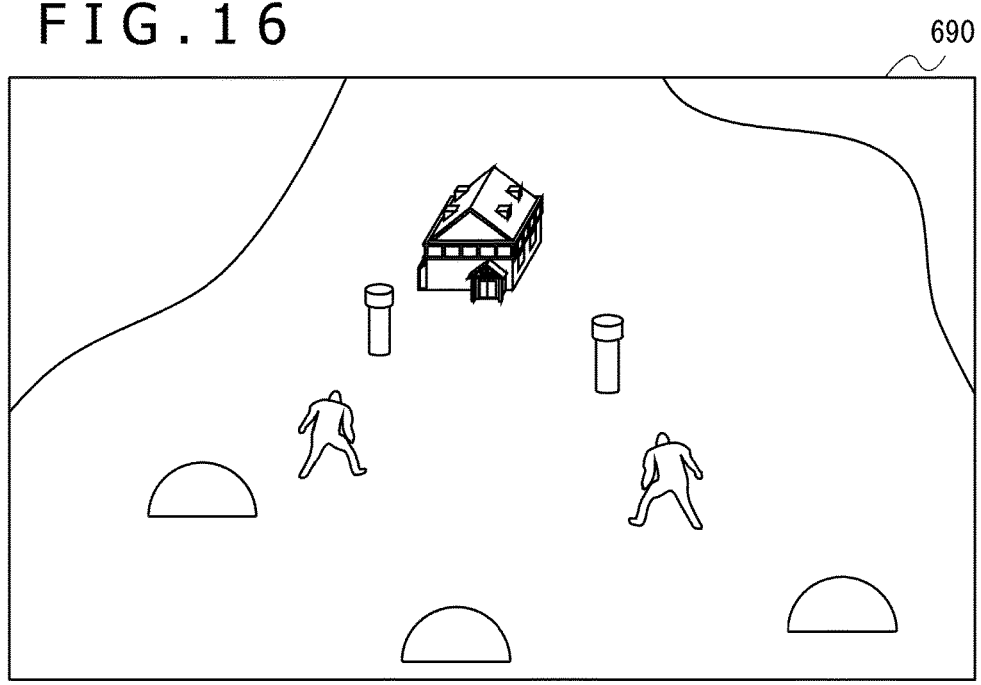
FIG. 16 is a schematic diagram showing still another typical watching screen displayed on the watching player terminal.

If the armored helicopter is destroyed by the attack of the monster, the game controlling unit 141 notifies the watching point setting unit 144 that the armored helicopter has been destroyed. In turn, the watching point setting unit 144 notifies the watching managing server 200 that the viewpoint of the armored helicopter has deleted. This causes the viewpoint of the armored helicopter to be deleted, with the watching player moved forcibly to another viewpoint. For example, the watching point setting unit 144 may move the watching player who was watching the game from the viewpoint of the now destroyed armored helicopter to a viewpoint overlooking the entire game field. As shown in FIG. 16, the watching point setting unit 144 may thus cause the watching player terminal 500 to display a watching screen 690 that includes a game watching screen overlooking the entire game field. Following the change to the viewpoint overlooking the entire game field, the watching player managing unit 245 may again enable the watching player to change the viewpoint to the armored helicopter if predetermined conditions are met. For example, upon elapse of a predetermined time period from the destruction of the armored helicopter, the watching player managing unit 245 may again allow the watching player to switch to the viewpoint of the armored helicopter. While the armored helicopter is being attacked by a monster, the watching player's viewpoint may be changed to another position before the destruction of the armored helicopter to avoid the "death" of the watching player if predetermined conditions are met. In another example, where the watching player is charged with a predetermined amount of money, the watching player managing unit 245 may change the watching player's viewpoint to another position.

Of a plurality of watching players watching the game from the viewpoint of the armored helicopter, a predetermined player may be allowed to pilot the armored helicopter. For example, the watching screen UI managing unit 242 may add a user interface for executing the action of piloting the armored helicopter only to the watching screen transmitted to the highest-level watching player among the players watching the game from the viewpoint of the armored helicopter. The watching player instruction aggregating unit 244 receives through the user interface an instruction to execute the action of piloting the armored helicopter, and transmits the received instruction to the game managing server 100. Likewise, the viewpoint of an armored vehicle may be provided to let a representative watching player drive the armored vehicle.

In a role playing game as another example, there may be established as the watching viewpoint a bazaar place where such items as weapons and armors are bought and sold. The watching players watching the game from the viewpoint of the bazaar place may thus exchange their items between them at that bazaar place.

In a role playing game as still another example, there may be established as the watching viewpoint a non-player character who is a member of the game player's party. In this case, if there is no watching player, the non-player character may be controlled by the game managing server 100. In the presence of any watching player, that watching player may control the non-player character. Where the watching player controlling the non-player character participates in a battle of players' characters, the watching player may be awarded points or an increased ability score, for example.

When provided with the function of executing game-related actions as described above, the watching player can actively experience the ongoing game. The watching player can thus understand the specifics of the game and enjoy the world view offered by the game. The watching player need only control limited functions and thus can casually enjoy the game that may require advanced skills. Since the opportunity to casually enjoy games is provided extensively as discussed above, the general acceptance of the games will be further promoted.

The watching screen may present the watching player with information that is not presented to the game player. For example, in a role playing game, the watching screen may present items hidden in the game field, the positions and types of enemy characters, and other information. This allows the watching player not only to simply enjoy the game but also to enjoy watching the game player playing the game from the so-called "god's viewpoint."

Figure 17:
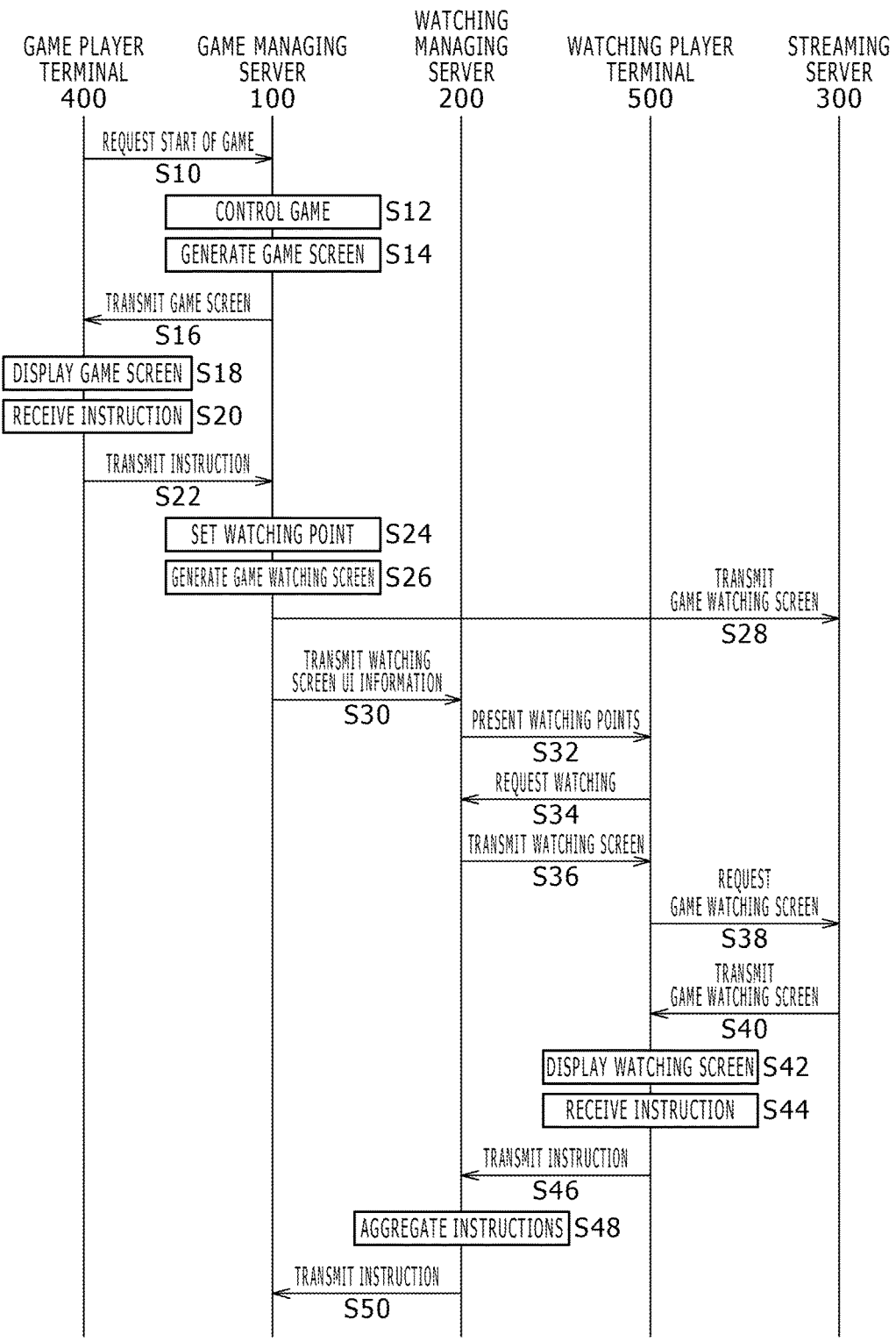
FIG. 17 is a sequence diagram showing the steps of a game controlling method in one embodiment of the present invention.

FIG. 17 is a sequence diagram showing the steps of the game controlling method in this embodiment. The game player accesses the game managing server 100 using the game player terminal 400 and requests the start of the game (S10). This causes the game controlling unit 141 of the game managing server 100 to start controlling the game (S12). The game screen generating unit 142 generates the game screen (S14), and transmits the generated game screen to the game player terminal 400 (S16). When the game screen acquiring unit 441 of the game player terminal 400 acquires the game screen, the game screen displaying unit 442 displays the game screen on the display device 466 (S18). When the game player instruction receiving unit 443 of the game player terminal 400 receives an instruction from the game player through the input device 420 (S20), the game player instruction transmitting unit 444 transmits the received instruction to the game managing server (S22). When the game player instruction receiving unit 143 of the game managing server 100 receives the instruction from the game player terminal 400, the game player instruction receiving unit 143 forwards the instruction to the game controlling unit 141.

The watching point setting unit 144 of the game managing server 100 sets the watching point for generating the game watching screen (S144). The game watching screen generating unit 145 of the game managing server 100 generates the game watching screen in effect at the watching point (S26), and transmits the game watching screen to the streaming server 300 (S28). The watching screen UI information transmitting unit 147 of the game managing server 100 transmits watching screen UI information to the watching managing server 200 (S30). The watching request receiving unit 241 of the watching managing server 200, upon receipt of access from the watching player terminal 500, presents the watching player terminal 500 with watching points from which the game can be watched (S32). When the watching player terminal 500 selects one of the watching points and requests the watching managing server 200 to watch the game (S34), the watching screen generating unit 243 of the watching managing server 200 generates the watching screen including the watching user interface and transmits the generated watching screen to the watching player terminal 500 (S36). Upon acquiring the watching screen, the watching screen acquiring unit 541 of the watching player terminal 500 requests the streaming server 300 to transmit the game watching screen included in the watching screen (S38). The game watching screen distributing unit 342 of the streaming server 300 transmits the requested game watching screen to the watching player terminal 500 (S40). The watching screen displaying unit 542 of the watching player terminal 500 displays on the display device 566 the watching screen that includes the game watching screen and the watching user interface (S42). When the watching player instruction receiving unit 543 of the watching player terminal 500 receives an instruction from the watching player through the input device 520 (S44), the watching player instruction transmitting unit 544 transmits the instruction to the watching managing server 200 (S46). The watching player instruction aggregating unit 244 of the watching managing server 200 receives instructions from a plurality of watching player terminals 500, aggregates the received instructions, and determines the instruction to be transmitted to the game managing server 100 (S48). The watching player instruction aggregating unit 244 transmits the instruction thus determined to the game managing server 100 (S50). Upon receipt of the instruction from the watching managing server 200, the watching player instruction receiving unit 146 of the game managing server 100 forwards the instruction to the game controlling unit 141. Returning to step S12, the game controlling unit 141 of the game managing server 100 controls the game in accordance with the instruction received from the game player and with the instruction received from the watching player (S12).

Second Embodiment

The second embodiment of the present invention is described below in connection with techniques that allow the watching player to play a mini game associated with the game being played by the game player, so that the watching player can participate in the game being executed by the game player by way of the mini game. The overall configuration of the game system according to the second embodiment is substantially the same as the overall configuration of the game system according to the first embodiment shown in FIG. 1. In the second embodiment, the watching player terminal 500 acquires from the watching managing server 200 a mini game that can be executed in accordance with the progress state of the game being watched, and executes the acquired mini game. The watching player terminal 500 transmits the result of the execution of the mini game to the watching managing server 200. The watching managing server 200 transmits the result of the mini game execution coming from the watching player terminal 500 to the game managing server 100. In accordance with the result of the mini game execution from the watching player terminal 500, the game managing server 100 affects the game being executed by the player at the game player terminal 400. In this manner, the watching player can not only watch the game being executed by the game player but also affect the game within a range permitted to the watching player in accordance with the progress state of the game. This enhances the attractiveness of the game. Giving numerous watching players the opportunity to casually watch the game and to experience the joy of the game contributes to promoting the general acceptance of the game. The game player proceeds with the game while being encumbered by the watching players. This gives the game player an enjoyment different from that of solo playing, prompting the game player to continue playing the game for an extended time period without loosing interest.

Figure 18:
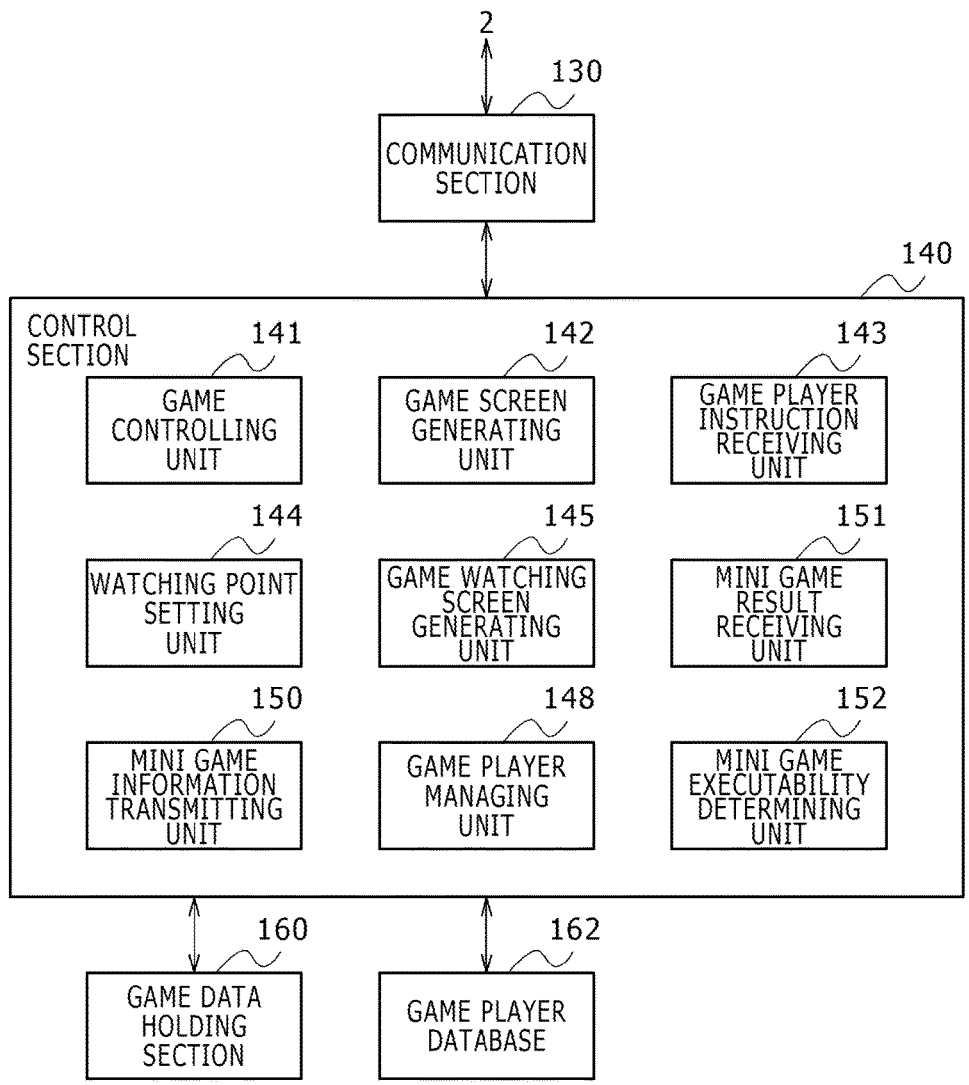
FIG. 18 is a schematic diagram showing a structure of a game managing server in a second embodiment of the present invention.

FIG. 18 shows a structure of a game managing server 100 in the second embodiment. The game managing server 100 in the second embodiment substitutes a mini game information transmitting unit 150, a mini game result receiving unit 151, and a mini game executability determining unit 152 for the watching player instruction receiving unit 146 and watching screen UI information transmitting unit 147 of the game managing server 100 in the first embodiment shown in FIG. 2. The other structures and their workings are the same as those of the first embodiment.

The mini game executability determining unit 152 determines the executability of the mini game by the watching player in accordance with the progress state of the game being controlled by the game controlling unit 141. The game data holding section 160 stores such data as the identification information about the mini game executable by the watching player, in association with the data representing the conditions to be met for the mini game to be executable. The mini game executability determining unit 152 determines whether or not the mini game can be executed by the watching player by referencing the game data holding section 160. The mini game information transmitting unit 150 transmits to the watching managing server 200 the information about the mini game executable by the watching player. When requested by the game player terminal 400 to help the watching player, the mini game information transmitting unit 150 may transmit the information about the mini game to the watching managing server 200 and instruct the watching managing server 200 to accept execution of the mini game by the watching player. The watching managing server 200 then transmits the mini game program to the watching player terminal 500.

The mini game result receiving unit 151 receives from the watching managing server 200 the result of the mini game executed on the watching player terminal 500, and forwards the received result to the game controlling unit 141. The game controlling unit 141 affects the game under its control in a predetermined manner in accordance with the mini game result. For example, upon receipt of a result indicative of a successful execution of the mini game, the game controlling unit 141 may affect the game in a manner improving its status that triggered execution of the mini game. On receiving a result indicative of an unsuccessful execution of the mini game, the game controlling unit 141 may leave the game unsupported in its poor status or may affect the game in a manner worsening its status.

Figure 19:
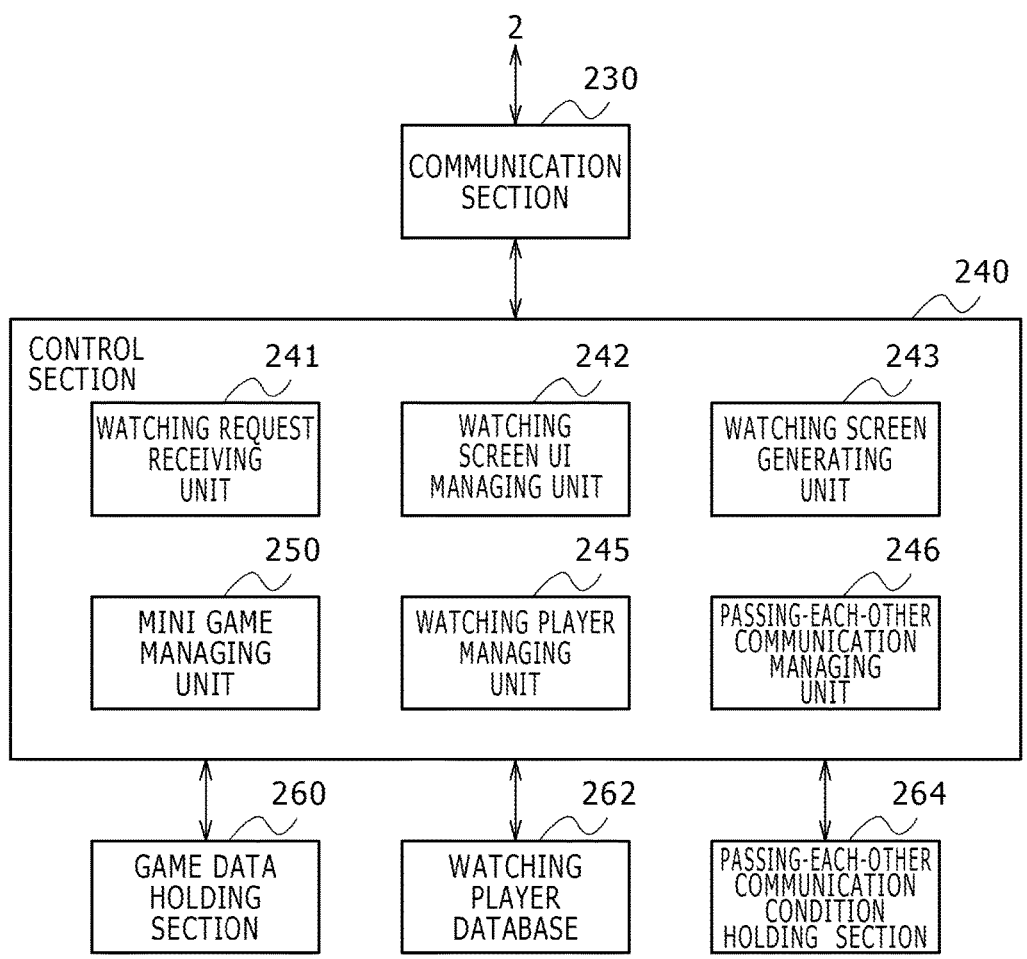
FIG. 19 is a schematic diagram showing a structure of a watching managing server in the second embodiment of the present invention.

FIG. 19 shows a structure of a watching managing server 200 in the second embodiment. The watching managing server 200 in the second embodiment substitutes a mini game managing unit 250 for the watching player instruction aggregating unit 244 in the watching managing server 200 of the first embodiment shown in FIG. 3. The other structures and their workings are the same as those of the first embodiment.

The mini game managing unit 250 acquires from the game managing server 100 the information about the mini game executable on the watching player terminal 500, and forwards the acquired information to the watching screen UI managing unit 242. The watching screen UI managing unit 242 displays, on the watching screen to be transmitted to the watching player terminal 500, the information about the executable mini game and a user interface for transmitting to the watching managing server 200 an instruction to execute the mini game. Upon receipt of the request to execute the mini game from the watching player terminal 500, the mini game managing unit 250 reads the program of the requested mini game from the game data holding section 260 and transmits the mini game program to the watching player terminal 500. The mini game managing unit 250 acquires the result of the execution of the mini game from the watching player terminal 500 having executed the mini game program, and transmits the result of the mini game execution to the game managing server 100.

Figure 20:
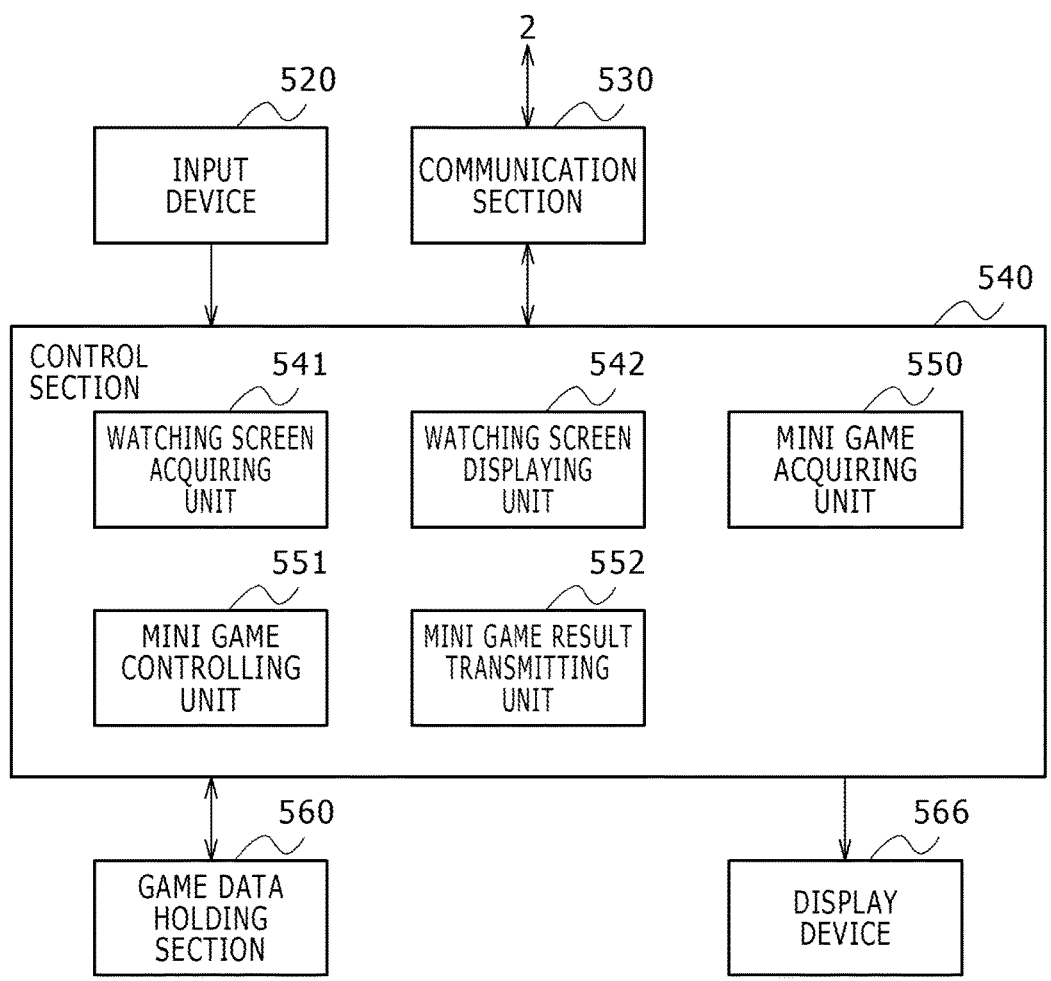
FIG. 20 is a schematic diagram showing a structure of a watching player terminal in the second embodiment of the present invention.

FIG. 20 shows a structure of a watching player terminal 500 in the second embodiment. The watching player terminal 500 in the second embodiment substitutes a mini game acquiring unit 550, a mini game controlling unit 551, and a mini game result transmitting unit 552 for the watching player instruction receiving unit 543 and watching player instruction transmitting unit 544 in the watching player terminal 500 of the first embodiment shown in FIG. 6. The other structures and their workings are the same as those of the first embodiment.

The mini game acquiring unit 550 requests execution of the mini game from the watching managing server 200, the request being made through a user interface intended to request mini game execution and arranged on the watching screen provided by the watching managing server 200. With this request, the mini game acquiring unit 550 acquires the mini game program from the watching managing server 200. The mini game controlling unit 551 executes the mini game program acquired from the watching managing server 200, and controls the mini game in accordance with the instructions input by the watching player through the input device 520. The mini game result transmitting unit 552 transmits the result of the mini game to the watching managing server 200.

Figure 21:
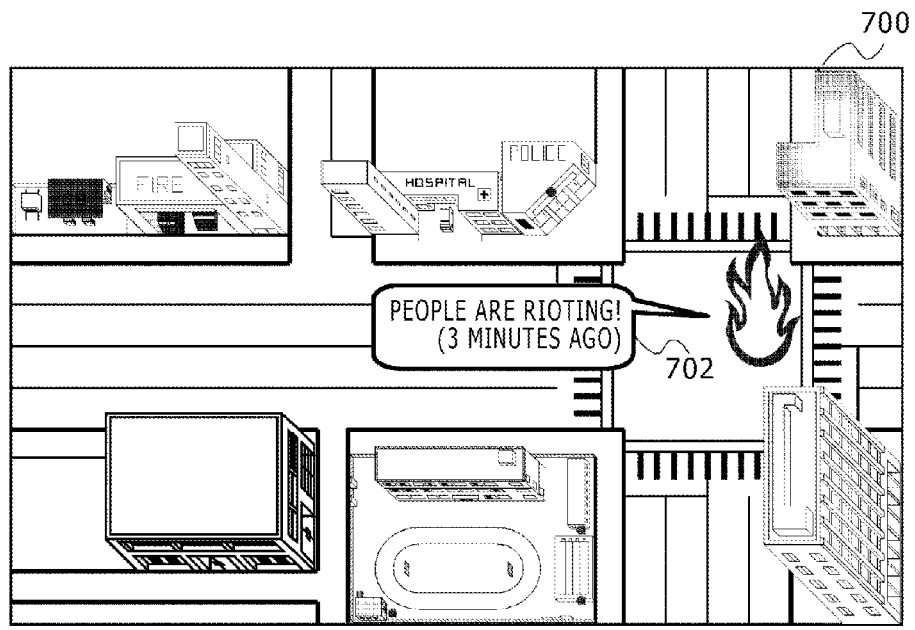
FIG. 21 is a schematic diagram showing another typical watching screen displayed on the watching player terminal.

FIG. 21 shows another typical watching screen displayed on the watching player terminal. In an urban development simulation game, the game controlling unit 141 of the game managing server 100 builds facilities in a city in response to the game player's instructions to simulate the increase and decrease in the city's population, and the city's growth and decline, for example. The watching point setting unit 144 sets viewpoints for overlooking the city. The game watching screen generating unit 145 renders images of the city as viewed from the viewpoints thus established. The watching screen generating unit 243 of the watching managing server 200 generates the watching screen displaying a game watching screen that is generated by the game watching screen generating unit 145 and distributed by the streaming server 300. The watching screen generating unit 243 then transmits the generated watching screen to the watching player terminal 500. The watching screen acquiring unit 541 of the watching player terminal 500 acquires the watching screen from the watching managing server 200. The watching screen displaying unit 542 displays the acquired watching screen on the display device 566.

In the simulation by the game controlling unit 141 of the game managing server 100, a riot by people at facilities built in the city may be simulated. In that case, the mini game executability determining unit 152 determines that the conditions for the mini game to be executable have been met. The mini game information transmitting unit 150 then transmits to the watching managing server 200 information about a shooting game for bringing the rioting people under control. The watching screen UI managing unit 242 of the watching managing server 200 adds to the watching screen a user interface for transmitting to the watching managing server 200 an instruction to execute the mini game. In the example of FIG. 21, a notification 702 that a riot has occurred is displayed at the location on a game watching screen 700 where the riot has broken out. When the watching player touches the notification 702, the mini game acquiring unit 550 of the watching player terminal 500 requests execution of the mini game from the watching managing server 200. The mini game managing unit 250 of the watching managing server 200 reads from the game data holding section 260 the shooting game for bringing the rioting people under control, the shooting game being the mini game executable by the watching player. The mini game managing unit 250 transmits the shooting game thus read to the watching player terminal 500.

Figure 22:
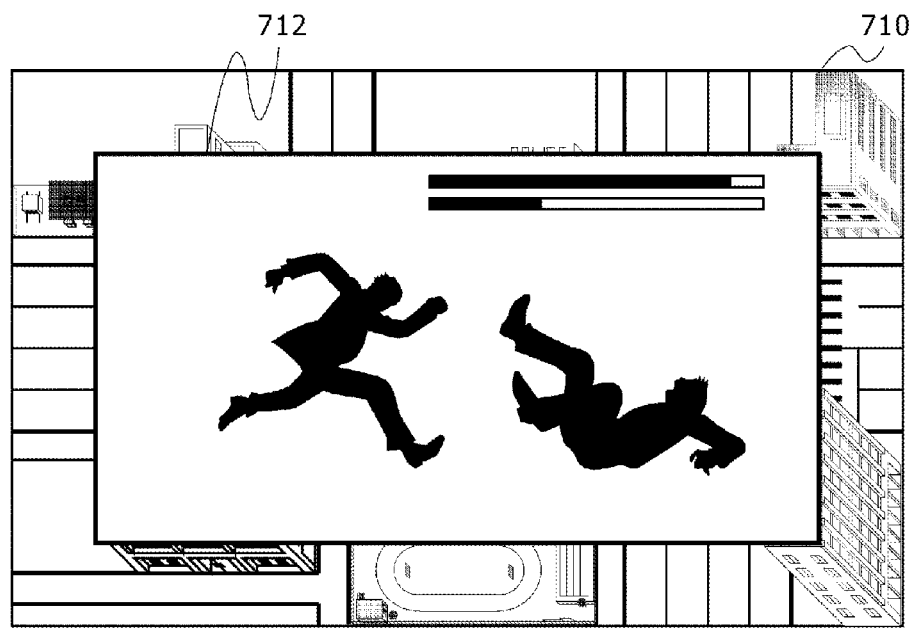
FIG. 22 is a schematic diagram showing still another typical watching screen displayed on the watching player terminal.

FIG. 22 shows still another typical watching screen displayed on the watching player terminal. The mini game controlling unit 551 of the watching player terminal 500 executes the mini game acquired from the watching managing server 200. The mini game controlling unit 551 superimposes and displays a mini game screen 712 on a game watching screen 710 to receive the input of the watching player's instructions from the input device 520. During mini game execution, the watching screen displaying unit 542 acquires the game watching screen 710 from the streaming server 300 and continues to display the game watching screen 710 in the background of the mini game screen 712. When the watching player touches the game watching screen 710 during mini game execution, the mini game controlling unit 551 may temporarily stop the execution of the mini game and make the mini game screen 712 translucent or hidden from view to let the watching player view the entire game watching screen 710. Where the watching screen is offered as a webpage, the mini game may be provided as a program that can be executed on a web browser for viewing webpages. In another example, the mini game may be provided as an application different from the application for viewing the watching screen.

Figure 23:
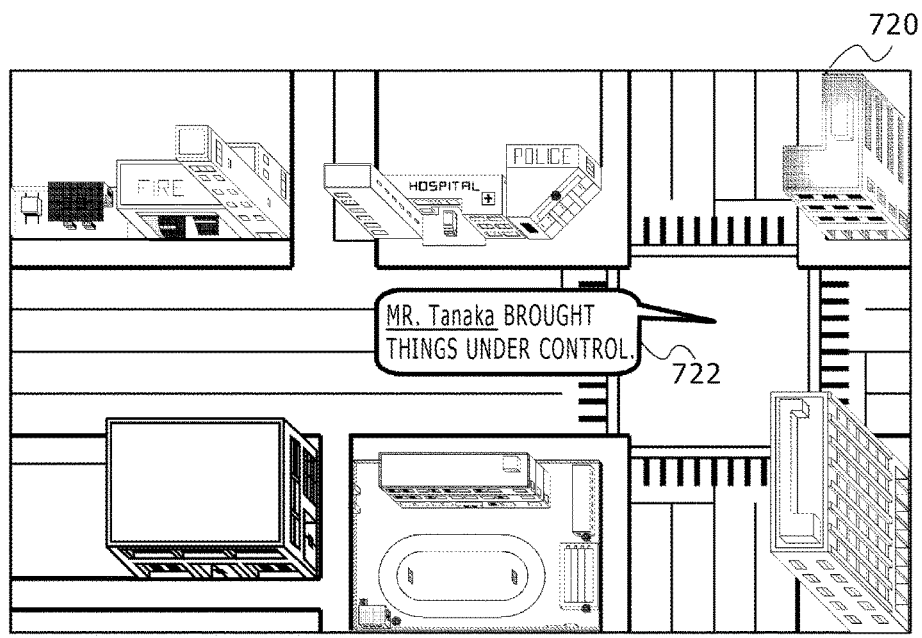
FIG. 23 is a schematic diagram showing another typical game screen displayed on a game player terminal.

FIG. 23 shows another typical game screen displayed on the game player terminal. After execution of the mini game has ended on the watching player terminal 500, the mini game result transmitting unit 552 of the watching player terminal 500 transmits the result of the mini game to the watching managing server 200. The mini game managing unit 250 of the watching managing server 200 transmits to the game managing server 100 the mini game result acquired from the watching player terminal 500. Upon receipt of the mini game result from the watching managing server 200, the mini game result receiving unit 151 of the game managing server 100 forwards the received result to the game controlling unit 141. If the watching player has successfully executed the mini game, the game controlling unit 141 brings the people's riot under control in the simulated city. At the location on a game screen 720 where people rioted, the game controlling unit 141 displays a notification 722 that the watching player has brought the riot under control. When the game player touches the notification 722, the game controlling unit 141 displays a user interface for transmitting a thank-you message to the watching player. The game controlling unit 141 transmits the message received from the game player to the watching player terminal 500 via the watching managing server 200. If the watching player has failed in executing the mini game, the game controlling unit 141 continues to simulate the situation where people are rioting.

The mini game may be one in which the game player builds a building in the city. When the game controlling unit of the game managing server 100 is set to build a building in the city in response to the game player's instruction, the mini game executability determining unit 152 determines that the conditions for mini game to be executable have been met. This causes the mini game information transmitting unit 150 to transmit to the watching managing server 200 the information about the mini game for constructing a building. If the watching player has successfully executed the mini game, the game controlling unit 141 may complete the building more quickly than if the watching player has failed in executing the mini game. The game controlling unit 141 may determine the quality of the completed building in accordance with the score of the mini game. For example, there may be prepared a plurality of buildings of different qualities. The higher the mini game score, the higher the quality that may be afforded to the building to be built.

While the game player is executing the role playing game, the watching player may be allowed to execute a mini game for canceling gimmicks such as traps set in the game field. When the game player discovers a gimmick set in the game field and requests cancellation of the gimmick, the mini game executability determining unit 152 of the game managing server 100 determines that the conditions for the mini game to be executable have been met. This causes the mini game information transmitting unit 150 to transmit to the watching managing server 200 the information about the mini game for canceling the gimmick. If the watching player has successfully executed the mini game, the game controlling unit 141 cancels the gimmick set in the game field. If the watching player has failed in executing the mini game, the game controlling unit 141 does not cancel the gimmick. Alternatively, the watching player may be allowed to execute a mini game for setting a gimmick in the game field. In this case, the game controlling unit 141 sets the gimmick in the game field if the watching player has successfully executed the mini game. If the watching player has failed in executing the mini game, the game controlling unit 141 does not set the gimmick.

While the game player is executing the role playing game, the watching player may be allowed to execute a mini game for generating an item, a character, or some other entity and giving it to the game player. The mini game executability determining unit 152 of the game managing server 100 maintains the mini game always executable by the watching player. The watching screen UI managing unit 242 of the watching managing server 200 continuously displays on the watching screen a user interface for issuing the instruction to execute the mini game. The watching player may execute the mini game at a desired timing. If the watching player has successfully executed the mini game, the game controlling unit 141 gives the game player an item, a character, or other entity in accordance with the mini game type. In this case, the game controlling unit 141 may also determine the item, character, or other entity to be given away in accordance with the score of the mini game.

The mini game may also be one in which input operations are performed in tune with music. The piece of music to be used in the mini game may be one associated with the game, such as the theme song of the game executed by the game player, a tie-up song in collaboration with a project associated with the game, a cheering song, or a song selected by the game player. The mini game may be staged so that the watching player will clap his/her hands and wave his/her megaphone in time to the cheering song, for example, to root for the game player. The game controlling unit 141 may give benefits to the game player in accordance with the score of the mini game. After acquisition of the result of the mini game, the game screen generating unit 142 or the game watching screen generating unit 145 may display how the watching player's avatar is dancing in time to the music on the game screen or on the game watching screen. At this time, if the mini game score is high, the avatar may be shown to dance well in time to the music; if the mini game score is not very high, the avatar may be shown to dance poorly. Alternatively, the results of the mini game executed by a plurality of watching players may be acquired, and the avatars of these watching players may be displayed simultaneously. This will allow the watching players to share a sense of unity.

The mini game may also be one that allows the watching player to change the position of the viewpoint from which to watch the game. For example, the mini game may be one in which a character is moved across the game field where gimmicks, enemy characters, and other entities are arranged. The watching point setting unit 144 of the game managing server 100 may set the watching point at the position reached by the character during the mini game. This will heighten the watching player's interest when the watching player changes the watching point. The degree of difficulty of a mini game for changing the watching point to a position that gives a better view of the game may be set to be higher than the degree of difficulty of a mini game for switching to some other watching point. If a plurality of watching points are provided and any one of them can be set, a plurality of positions to be reached during the mini game may be established relative to the watching points.

The mini game managing unit 250 of the watching managing server 200 may allow the same mini game associated with the game executed by the same game player to be executable by a plurality of watching players in parallel. In this case, of the results of the mini game executed by the multiple watching players, only the result meeting a predetermined condition (e.g., the result from the watching player having successfully executed the mini game faster than anyone else) may be reflected in the game controlled by the game managing server 100. The mini game managing unit 250 may give benefits to the first watching player having successfully executed the mini game. The game screen generating unit 142 or game watching screen generating unit 145 of the game managing server 100 may also display, on the game screen or on the game watching screen, the results from the multiple watching players having executed the mini game.

In the game system of the first embodiment, the instruction input received by the watching player terminal 500 from the watching player is transmitted to the game managing server 100 via the watching managing server 200. The transmitted instruction input is reflected in the game by the game controlling unit 141 of the game managing server 100. In the game system of the second embodiment, the watching player terminal 500 acquires and executes the mini game program. This means that the instruction input by the watching player is instantaneously reflected in the mini game being executed on the watching player terminal 500 without intervention of the game managing server 100. The second embodiment thus reduces the response delay time attributable to communication delays during mini game execution while giving the watching player the opportunity to participate in the game through execution of the mini game. With the mini game distributed to and executed on the watching player terminal 500, the game managing server 100 and the watching managing server 200 are protected from being overloaded.

After execution of the mini game, the watching player may be presented with a show dramatizing the result of the mini game being reflected in the game, until the mini game result is actually reflected in the game. For example, after the mini game for generating an item has been successfully executed, there may be a show dramatizing the generated item being transported, until the item is actually given to the game player. The show may be executed by the mini game controlling unit 551 of the watching player terminal 500, by the mini game managing unit 250 or watching screen generating unit 243 of the watching managing server 200, or by the game screen generating unit 142 or game watching screen generating unit 145 of the game managing server 100.

There may be no need to have the mini game result reflected immediately in the game. This applies, for example, to the above-mentioned mini game for generating the item, character, or other entity in the role playing game. In such a case, the mini game acquiring unit 550 of the watching player terminal 500 may store the acquired mini game into the game data holding section 560. The mini game controlling unit 551 may read the mini game from the game data holding section 560 at a suitable timing, have it executed offline, and store the result of the mini game execution into the game data holding section 560. When the communication section 530 becomes communicable with the watching managing server 200, the mini game result transmitting unit 552 may read the mini game result from the game data holding section 560 and transmit the result to the watching managing server 200. Alternatively, the mini game acquiring unit 550 may acquire a plurality of different mini games and store the games into the game data holding section 560. In this case, the watching player can enjoy executing any of the stored mini games locally even in an environment where communication is impossible.

While the present invention has been described in conjunction with specific embodiments given as examples, it should be understood by those skilled in the art that the above-described composing elements and various processes may be combined in diverse ways and that such combinations, variations and modifications also fall within the scope of this invention.

REFERENCE SIGNS LIST

1 Game system
100 Game managing server
141 Game controlling unit
142 Game screen generating unit
143 Game player instruction receiving unit
144 Watching point setting unit
145 Game watching screen generating unit
146 Watching player instruction receiving unit
147 Watching screen UI information transmitting unit
148 Game player managing unit
150 Mini game information transmitting unit
151 Mini game result receiving unit
152 Mini game executability determining unit
200 Watching managing server
241 Watching request receiving unit
242 Watching screen UI managing unit
243 Watching screen generating unit
244 Watching player instruction aggregating unit
245 Watching player managing unit
246 Passing-each-other communication managing unit
250 Mini game managing unit
300 Streaming server
341 Game watching screen acquiring unit
342 Game watching screen distributing unit
400 Game player terminal
420 Input device
441 Game screen acquiring unit
442 Game screen displaying unit
443 Game player instruction receiving unit
444 Game player instruction transmitting unit
466 Display device
500 Watching player terminal
520 Input device
541 Watching screen acquiring unit
542 Watching screen displaying unit
543 Watching player instruction receiving unit
544 Watching player instruction transmitting unit
550 Mini game acquiring unit
551 Mini game controlling unit
552 Mini game result transmitting unit
566 Display device

INDUSTRIAL APPLICABILITY

The present invention is applicable to game systems for controlling a game that can be participated in by a plurality of players.

The invention claimed is:

1. A game controlling apparatus comprising:
a game controlling unit configured to control a game;
a game player instruction receiving unit configured to receive an instruction from a game player and forward the instruction to the game controlling unit;
a watching point setting unit configured to set a viewpoint for generating a watching screen for viewing the game, the watching screen being offered to a plurality of watching players, each using a respective watching player terminal, different from the game player;
a user interface managing unit configured to transmit information about an action defined for each viewpoint and executable by any of the watching players to any of the watching player terminals;
a watching player instruction receiving unit configured to receive an instruction to execute the action from the watching player terminal and forward the instruction to the game controlling unit; and
a communication managing unit configured to generate a predetermined event between at least two of the watching players when the watching player terminals of the at least two watching players come within a predetermined distance of one another,
wherein the game controlling unit executes the action in accordance with the action execution instruction forwarded from the watching player instruction receiving unit, whereby the action affects the gameplay.

2. The game controlling apparatus according to claim 1, wherein the watching point setting unit dynamically sets or deletes the viewpoint in accordance with status of the game.

3. The game controlling apparatus according to claim 1, wherein
the watching point setting unit sets a plurality of the viewpoints, and
the game controlling apparatus further comprises a watching request receiving unit configured to present each watching player with the watching screen including the viewpoints and an entire game field in order to receive the selected viewpoint.

4. The game controlling apparatus according to claim 1, wherein the user interface managing unit allows a different action to be executable in accordance with an attribute of the watching player.

5. A game system comprising:
a game controlling unit configured to control a game;
a game player instruction receiving unit configured to receive an instruction from a game player and forward the instruction to the game controlling unit;
a watching point setting unit configured to set a viewpoint for generating a watching screen for viewing the game, the watching screen being offered to a plurality of watching players, each using a respective watching player terminal, different from the game player;
a user interface managing unit configured to transmit information about an action defined for each viewpoint and executable by any of the watching players to any of the watching player terminals;
a watching player instruction receiving unit configured to receive an instruction to execute the action from the watching player terminal and forward the instruction to the game controlling unit; and
a communication managing unit configured to generate a predetermined event between at least two of the watching players when the watching player terminals of the at least two watching players come within a predetermined distance of one another,
wherein the game controlling unit executes the action in accordance with the action execution instruction forwarded from the watching player instruction receiving unit, whereby the action affects the gameplay.

6. A game controlling method comprising:
causing a game controlling unit of a computer to control a game;

causing a game player instruction receiving unit of the computer to receive an instruction from a game player and forward the instruction to the game controlling unit;

causing a watching point setting unit of the computer to set a viewpoint for generating a watching screen for viewing the game, the watching screen being offered to a plurality of watching players, each using a respective watching player terminal, different from the game player;

causing a user interface managing unit to transmit information about an action defined for each viewpoint and executable by any of the watching players to any of the watching player terminals;

causing a watching player instruction receiving unit to receive an instruction to execute the action from the watching player terminal and forward the instruction to the game controlling unit; and causing a communication managing unit configured to generate a predetermined event between at least two of the watching players when the watching player terminals of the at least two watching players come within a predetermined distance of one another, wherein the game controlling unit executes the action in accordance with the action execution instruction forwarded from the watching player instruction receiving unit, whereby the action affects the gameplay.

7. The game controlling apparatus of claim 1, wherein the predetermined event includes exchanging one or more of game characters and game items between the watching player terminals of the at least two watching players.

8. The game controlling apparatus of claim 1, wherein the predetermined event includes increasing at least one of a game point value, a game level, and a game ability score between the watching player terminals of the at least two watching players.

9. The game controlling apparatus of claim 1, wherein the communication managing unit is also configured to generate the predetermined event between at least two of the watching players when the watching player terminals of the at least two watching players do not come within the predetermined distance of one another, but instead when the at least two watching players watch the game from the same viewpoint or from one of a plurality of related viewpoints.

* * * * *